US011841447B2

(12) United States Patent
Nguyen et al.

(10) Patent No.: US 11,841,447 B2
(45) Date of Patent: Dec. 12, 2023

(54) 3D ANGLE OF ARRIVAL CAPABILITY IN ELECTRONIC DEVICES WITH ADAPTABILITY VIA MEMORY AUGMENTATION

(71) Applicant: Samsung Electronics Co., Ltd., Suwon-si (KR)

(72) Inventors: Khuong N. Nguyen, Frisco, TX (US); Yuming Zhu, Plano, TX (US); Neha Dawar, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/559,872

(22) Filed: Dec. 22, 2021

(65) Prior Publication Data

US 2022/0214418 A1    Jul. 7, 2022

Related U.S. Application Data

(60) Provisional application No. 63/134,366, filed on Jan. 6, 2021.

(51) Int. Cl.
| | |
|---|---|
| *G01S 3/04* | (2006.01) |
| *G01S 3/48* | (2006.01) |
| *G01S 3/22* | (2006.01) |
| *G01S 3/50* | (2006.01) |
| *G06N 3/044* | (2023.01) |

(52) U.S. Cl.
CPC ............. *G01S 3/043* (2013.01); *G01S 3/22* (2013.01); *G01S 3/48* (2013.01); *G01S 3/50* (2013.01); *G06N 3/044* (2023.01)

(58) Field of Classification Search
CPC ..... G01S 3/043; G01S 3/22; G01S 3/48; G01S 3/50; G06N 3/044
USPC ................ 342/445, 146, 234, 442
See application file for complete search history.

(56) References Cited

U.S. PATENT DOCUMENTS

| | | | |
|---|---|---|---|
| 10,788,835 B2 | 9/2020 | Hurd et al. | |
| 11,151,792 B2 | 10/2021 | Nattinger et al. | |
| 2010/0141503 A1* | 6/2010 | Baumatz | G01J 1/42 |
| | | | 250/234 |

(Continued)

OTHER PUBLICATIONS

International Search Report and Written Opinion dated Apr. 26, 2022 regarding Application No. PCT/KR2022/000144, 8 pages.

*Primary Examiner* — Bo Fan

(57) ABSTRACT

A method includes obtaining signal information based on wireless signals received from a target electronic device via a first antenna pair and a second antenna pair. The first and second antenna pairs are aligned along different axes. The signal information includes channel information, range information, a first angle of arrival (AoA) based on the first antenna pair, and a second AoA based on the second antenna pair. The method also includes obtaining tagging information that identifies an environment in which the electronic device is located. The method also includes generating encoded information from a memory module based on the tagging information. The method further includes initializing a field of view (FoV) classifier based on the encoded information. Additionally, the method includes determining whether the target electronic device is in a FoV of the electronic device based on the FoV classifier operating on the signal information.

20 Claims, 22 Drawing Sheets

(56) References Cited

U.S. PATENT DOCUMENTS

| | | | |
|---|---|---|---|
| 2012/0249371 A1* | 10/2012 | Nguyen | G01S 1/68 |
| | | | 342/442 |
| 2014/0002306 A1* | 1/2014 | Nguyen | G01S 3/143 |
| | | | 342/442 |
| 2016/0069985 A1* | 3/2016 | Kwakkernaat | G08G 1/04 |
| | | | 342/146 |
| 2016/0358459 A1 | 12/2016 | Singhar et al. | |
| 2018/0091952 A1 | 3/2018 | Sant et al. | |
| 2019/0195981 A1 | 6/2019 | Ding et al. | |
| 2020/0245101 A1 | 7/2020 | Schober et al. | |
| 2020/0334393 A1* | 10/2020 | Wodrich | G06F 30/13 |
| 2020/0349738 A1 | 11/2020 | Kamma | |
| 2021/0224516 A1 | 7/2021 | Jain et al. | |
| 2021/0235012 A1 | 7/2021 | Sindhagatta Krishnappa et al. | |
| 2021/0304577 A1 | 9/2021 | Hollar et al. | |

\* cited by examiner

3D ANGLE OF ARRIVAL CAPABILITY IN ELECTRONIC DEVICES WITH ADAPTABILITY VIA MEMORY AUGMENTATION

CROSS-REFERENCE TO RELATED APPLICATIONS AND CLAIM OF PRIORITY

The present application claims priority to U.S. Provisional Patent Application No. 63/134,366 filed on Jan. 6, 2021. The content of the above-identified patent document is incorporated herein by reference.

TECHNICAL FIELD

The present disclosure relates generally to localizing an electronic device. More specifically, this disclosure relates to three-dimensional angle of arrival capabilities in electronic devices.

BACKGROUND

The use of mobile computing technology has greatly expanded largely due to usability, convenience, computing power, and the like. One result of the recent technological development is that electronic devices are becoming more compact, while the number of functions and features that a given device can perform is increasing. Certain electronic devices can determine whether another device is within its field of view. For example, an electronic device can transmit and receive signals with other devices and determine an angle of arrival (AoA) of the received signals and a distance between the devices. The signals can be corrupted which can create inaccurate AoA and range determinations. Inaccurate AoA and range determinations, can cause the electronic device to incorrectly determine that another electronic device is within its field of view or outside its field of view.

Ultra-wideband (UWB) is a radio technology that employs a low energy transmission with a high bandwidth over a large portion a radio spectrum. The low energy transmission is performed over short-range at the high bandwidth, such as over five-hundred mega-hertz (MHz). UWB applications include sensor data collection, positional location, and tracking applications.

SUMMARY

Embodiments of the present disclosure provide methods and apparatuses for three-dimensional angle of arrival capability in electronic devices.

In one embodiment, an electronic device is provided. The electronic device includes a processor. The processor is configured to obtain signal information based on wireless signals received from a target electronic device via a first antenna pair and a second antenna pair. The first and second antenna pairs are aligned along different axes. The signal information includes channel information, range information, a first AoA of the wireless signals based on the first antenna pair, and a second AoA of the wireless signals based on the second antenna pair. The processor is also configured to obtain tagging information that identifies an environment in which the electronic device is located. The processor is also configured to generate encoded information from a memory module based on the tagging information. The processor is further configured to initialize a field of view (FoV) classifier based on the encoded information. Additionally, the processor is configured to determine whether the target device is in a FoV of the electronic device based on the FoV classifier operating on the signal information.

In another embodiment, a method for operating an electronic device is provided. The method includes obtaining signal information based on wireless signals received from a target electronic device via a first antenna pair and a second antenna pair. The first and second antenna pairs are aligned along different axes. The signal information includes channel information, range information, a first AoA of the wireless signals based on the first antenna pair, and a second AoA of the wireless signals based on the second antenna pair. The method also includes obtaining tagging information that identifies an environment in which the electronic device is located. The method also includes generating encoded information from a memory module based on the tagging information. The method further includes initializing a field of view (FoV) classifier based on the encoded information. Additionally, the method includes determining whether the target device is in a FoV of the electronic device based on the FoV classifier operating on the signal information.

In yet another embodiment a non-transitory computer readable medium containing instructions is provided. The instructions that when executed cause a processor to obtain signal information based on wireless signals received from a target electronic device via a first antenna pair and a second antenna pair. The first and second antenna pairs are aligned along different axes. The signal information includes channel information, range information, a first AoA of the wireless signals based on the first antenna pair, and a second AoA of the wireless signals based on the second antenna pair. The instructions that when executed also cause the processor to obtain tagging information that identifies an environment in which the electronic device is located. The instructions that when executed also cause the processor to generate encoded information from a memory module based on the tagging information. The instructions that when executed further cause the processor to initialize a field of view (FoV) classifier based on the encoded information. Additionally, the instructions that when executed cause the processor to determine whether the target device is in a FoV of the electronic device based on the FoV classifier operating on the signal information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
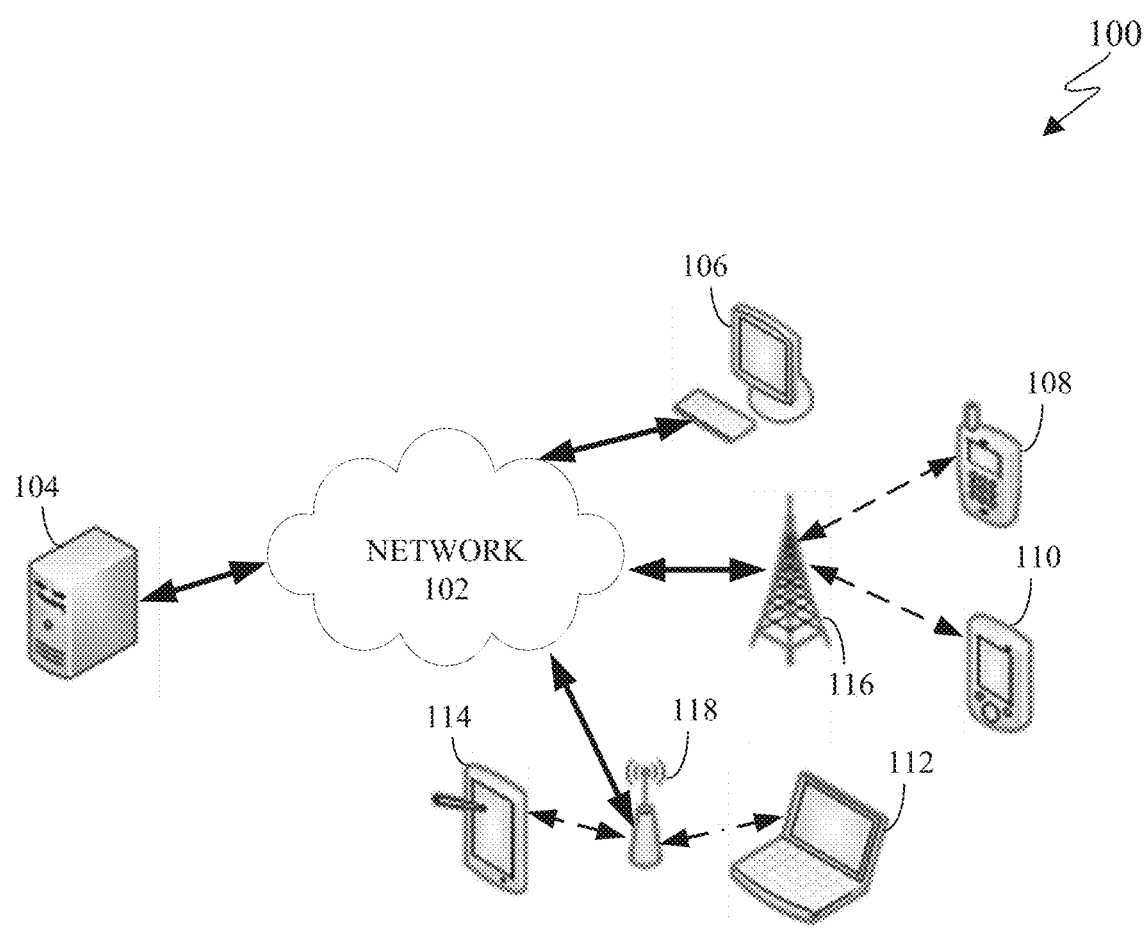
FIG. 1 illustrates an example communication system according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

An electronic device, according to embodiments of the present disclosure, can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Certain embodiments of the present disclosure provide a system that includes a device and one or multiple targets. The device and target(s) are both equipped with wireless transmitters, receivers, transceivers, or sensors. Similarly, the transmitter (or transceiver) target devices can be a UWB transmitter (or UWB transceiver). The device, or both the device and the target(s), are capable of measuring angle of arrival (AoA) in azimuth (AoA_az) and elevation (AoA_el) based on the signal transmitted by the transmitter of the target or a transmitter of a device. One example of such transceiver or sensors is an ultra wideband (UWB) transceiver or sensor. Embodiments of the present disclosure address a problem of identifying if the target is within a certain 3D field of view (FoV), in terms of its location in azimuth and elevation, of the device using UWB technology. As used herein target device and external electronic device are used interchangeably and refer to a device that the electronic device is attempting to locate.

Generally, UWB measurements between the device and target are impacted by impairments such as antenna and RF impairments and can also suffer from multipath effect. Without proper processing, it is difficult to identify a location of the target. Specifically, environmental factors can affect the field of view classification performance.

FoV can be any range of angles around the boresight within which the target device can be defined as identifiable or present. If there is direct line of sight (LoS) between the electronic device and target device, and range and angle of arrival (AoA) measurements can be used to identify whether the presence of target device is in the FoV.

UWB signals provide centimeter level ranging. For example, if the target device is within LoS of the electronic device, the electronic device can determine the range (distance) between the two devices with an accuracy that is within ten centimeters. Alternatively if the target device is not within a LoS of the electronic device, the electronic device can determine the range between the two devices with an accuracy that is within fifty centimeters. Additionally, if the target device is within LoS of the electronic device, the electronic device can determine the AoA between the two devices with an accuracy that is within three degrees.

Certain embodiments of the present disclosure provide a system and method to more accurately detect if the target is present in a three-dimensional (3D) field of view (FoV) of the device. The 3D FoV detection is useful to achieve a better user experience in applications such as peer-to-peer file sharing, augmented reality (AR)/virtual reality (VR) applications, and the like. Certain embodiments provide a system that has the capability to continuously learn and adapt to the environment. That is, embodiments of the present disclosure provide a system and method that is robust toward environmental change. Additionally, certain embodiments of the present disclosure address the problem in the context of identifying the FoV location using UWB technology, and addresses a problem that involves radar-based sensor.

To address this UWB impairment issue, embodiments of the present disclosure use an augmented memory module (AMM) that provides a FoV classifier a capability to continuously learn and adapt to the environment. Existing UWB solutions do not use an AMM. The utilization of the AMM is described as follows. When the 3D FOV system encounters an unknown environment, the 3D FOV classifier starts from a blank state, meaning there is no memory of this new environment. This will result in lower performance of the classifier at the beginning. The performance will increase when the classifier becomes more familiar with the performance by processing more inputs gathered from this environment. At this point the current long term memory cell state of the classifier is tagged and stored in the AMM by a Memory Processor. Alternatively, when the system encounters a familiar environment, the encoded memory corresponding to this environment is retrieved from the AMM by the Memory Retriever and subsequently provided to the 3D FOV classifier. Therefore, the classifier is not required to start from a blank state and the performance in the beginning of the encounter is better. Additionally, the memory dedicated to this environment is updated from the additional encounter using the mechanism in the Memory Processor. This process provides the system a level of adaptability toward changes in the environment.

Certain embodiments of the present disclosure reduce the false positive rate (for example, a false indication of whether a target object lies in the FOV) by 1.5×-2× compared to FOV detectors that do not use an AMM. The stability and variation of AoA output are also significantly improved, thereby improving the user experience in applications that detect or find objects, in peer-to-peer file sharing, augmented reality, or in mixed-reality devices.

The present disclosure first describes the problem of identifying the presence of target in the 3D field of view (FoV) of the device. A target is in 3D FoV if azimuth and elevation are both in specified FoV angle regions. Embodiments of the present disclosure include: 1) Methods to use measurements to predict if the target is in a certain 3D FoV of the device using a classifier; and 2) Methods to evolve the classifier so that it can be highly adaptive and robust toward environmental changes. Certain embodiments of the present disclosure can be summarized as follows. A first embodiment includes: obtaining tagging information that identifies an environment in which a device is located; generating encoded information from a memory module based on the tagging information; initializing a classifier using the encoded information; and determining whether a target is in a FoV of the device based on the classifier operating on ultrawide band (UWB) features and measurements. A second embodiment includes: in cases where the device has previously encountered the environment, the encoded information includes a current long term memory cell state of the classifier; and, in cases where the device has not previously encountered the environment, the encoded information includes a generic initial state of the classifier. A third embodiment further includes updating the encoded information associated with the tagging information after the determining step.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

In certain embodiments, the server 104 is a neural network that is configured to extract features from the received signals, determine whether a target device (such as one of the client devices 108-114 is within the field of view of another one of the client devices 108-114), or both. In certain embodiments, the neural network is included within any of the client devices 106-114. When a neural network is included in a client device, the client device can use the neural network to extract features from the received signals, without having to transmit content over the network 102. Similarly, when a neural network is included in a client device, the client device can use the neural network to identify whether another client device is within the field of view of the client device that includes the neural network.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring transceiver. In certain embodiments, any of the client devices 106-114 can emit and collect UWB signals via a measuring transceiver.

In this example, some client devices 108-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

As illustrated, the laptop computer 112 can communicate with the mobile device 108. Based on the wireless signals which are communicated between these two devices, a device (such as the laptop computer 112, the mobile device 108, or another device, such as the server 104) obtaining channel information, range information, and AoA information. Channel information can include features of a channel impulse response (CIR) of a wireless channel between the laptop computer 112 and the mobile device 108. The range can be an instantaneous distance or variances in the distances between the laptop computer 112 and the mobile device 108, based on the wireless signals. Similarly, the AoA can be an instantaneous AoA measurement or variances in AoA measurements between the laptop computer 112 and the mobile device 108, based on the wireless signals.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
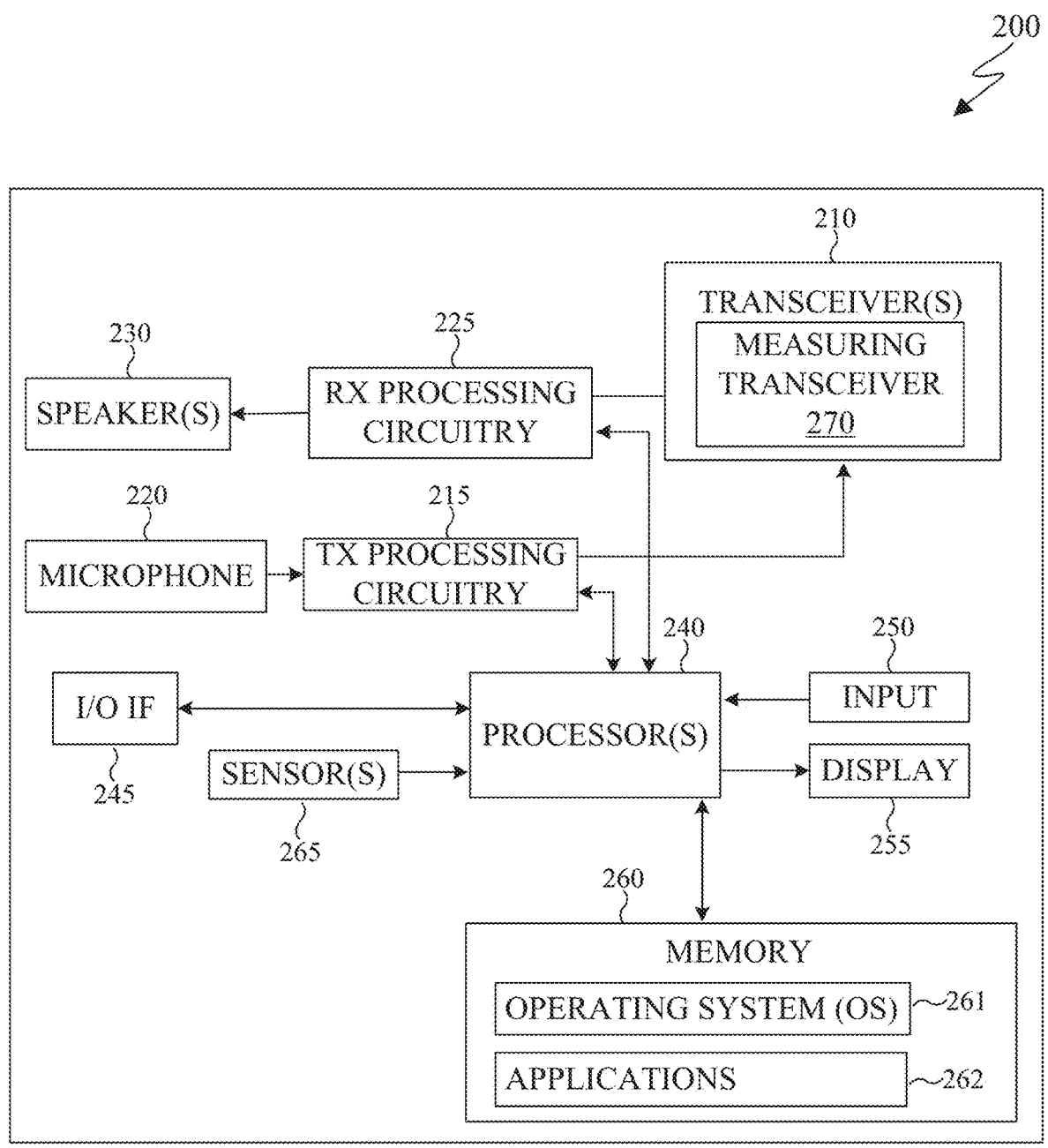
FIG. 2 illustrates an example electronic device according to embodiments of the present disclosure.

FIG. 2 illustrates an example electronic device in accordance with an embodiment of this disclosure. More particularly, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of the processor 240 include microprocessors, microcontrollers, digital signal processors, field programmable gate arrays, application specific integrated circuits, and discrete circuitry. In certain embodiments, the processor 240 includes a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the measuring transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is the measuring transceiver 270. The measuring transceiver 270 is configured to transmit and receive signals for detecting and ranging purposes. The measuring transceiver 270 can transmit and receive signals for measuring range and angle of an external object relative to the electronic device 200. The measuring transceiver 270 may be any type of transceiver including, but not limited to a WiFi transceiver, for example, an 802.11ay transceiver, a UWB transceiver, and the like. In certain embodiments, the measuring transceiver 270 includes a sensor. For example, the measuring transceiver 270 can operate both measuring and communication signals concurrently. The measuring transceiver 270 includes one or more antenna arrays, or antenna pairs, that each includes a transmitter (or transmitter antenna) and a receiver (or receiver antenna). The measuring transceiver 270 can transmit signals at various frequencies, such as in UWB. The measuring transceiver 270 can receive the signals from a target device (such as an external electronic device) for determining whether the target device within the FoV of the electronic device 200.

The transmitter, of the measuring transceiver 270, can transmit UWB signals. The receiver, of the measuring transceiver, can receive UWB signals from other electronic devices. The processor 240 can analyze the time difference, based on the time stamps of transmitted and received signals, to measure the distance of the target objects from the electronic device 200. Based on the time differences, the processor 240 can generate location information, indicating a distance that the target device is from the electronic device 200. In certain embodiments, the measuring transceiver 270 is a sensor that can detect range and AoA of another electronic device. For example, the measuring transceiver 270 can identify changes in azimuth and/or elevation of the other electronic device relative to the measuring transceiver 270. In certain embodiments, the measuring transceiver 270 represents two or more transceivers. Based on the differences between a signal received by each of the transceivers, the processor 240 can determine the identify changes in azimuth and/or elevation corresponding to the AoA of the received signals.

In certain embodiments, the measuring transceiver 270 can include pairs of antennas for measuring AoA of the signals. Based on the orientation of the antenna pairs, the measuring transceiver 270 can determine AoA in azimuth and AoA in elevation. FIG. 4C, below, describes an example orientation of two antenna pairs sharing one antenna.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3:
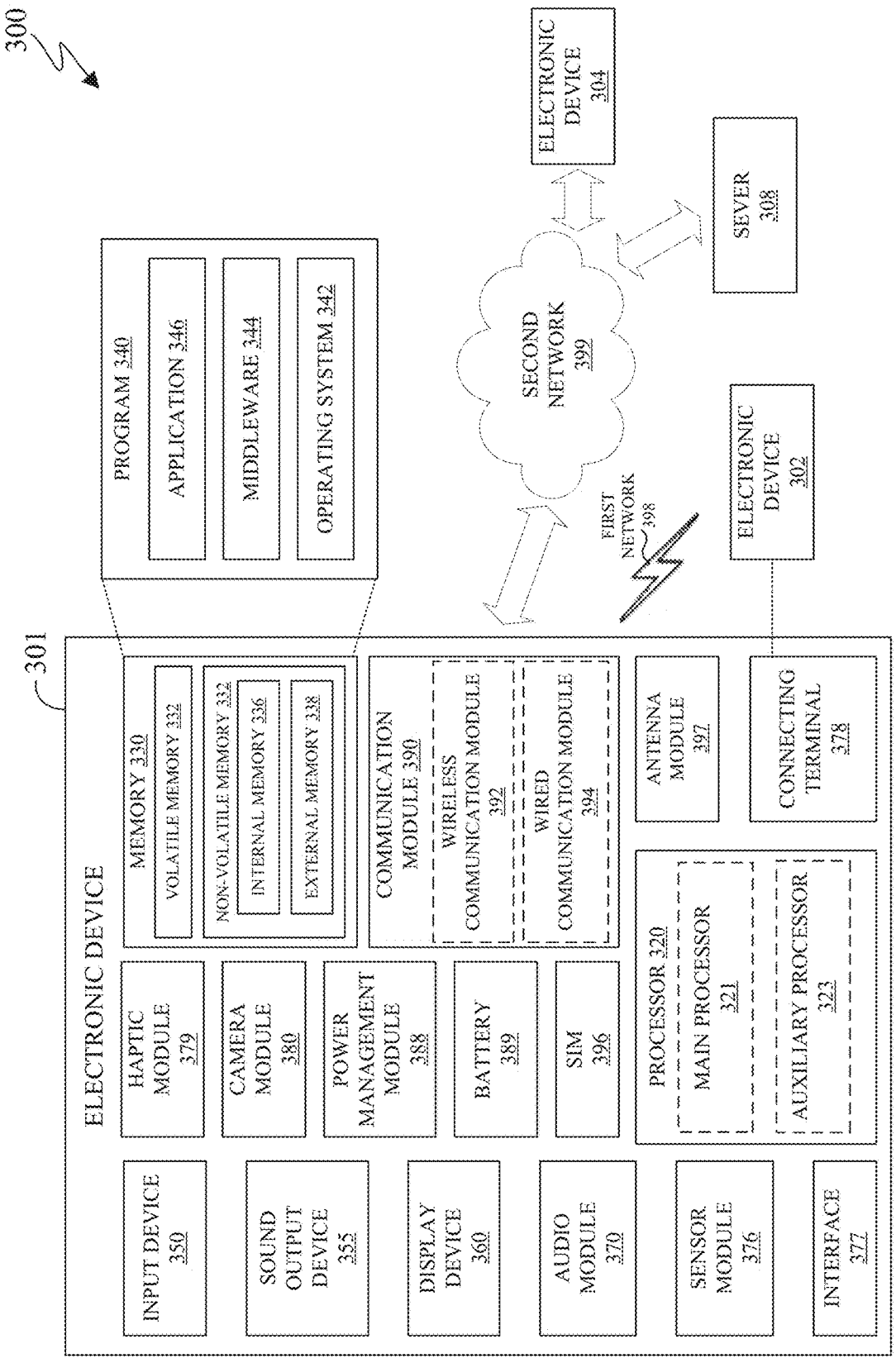
FIG. 3 illustrates an example network configuration according to embodiments of the present disclosure.

FIG. 3 illustrates an example network configuration according to embodiments of the present disclosure. An embodiment of the network configuration shown in FIG. 3 is for illustration only. One or more of the components illustrated in FIG. 3 can be implemented in specialized circuitry configured to perform the noted functions or one or more of the components can be implemented by one or more processors executing instructions to perform the noted functions.

FIG. 3 illustrated a block diagram illustrating a network configuration including an electronic device 301 in a network environment 300 according to various embodiments. As illustrated in FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The first network 398 and/or the second network 399 can be similar to the network 102 of FIG. 1. The electronic devices 301, 302, and 304 can be similar to any of the client devices 106-114 of FIG. 1 and include similar components to that of the electronic device 200 of FIG. 2. The server 308 can be similar to the server 104 of FIG. 1.

The electronic device 301 can be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320 and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334.

According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software. The program 340 may include, for example, an operating system (OS) 342, middleware 344, or an application 346.

The input device 350 may receive a command or data to be used by other components (e.g., the processor 320) of the electronic device 301, from the outside (e.g., a user) of the electronic device 301. The input device 350 may include, for example, a microphone, a mouse, a keyboard, or a digital pen (e.g., a stylus pen). In certain embodiments, the input device 350 includes a sensor for gesture recognition. For example, the input device 350 can include a transceiver similar to the measuring transceiver 270 of FIG. 2.

The sound output device 355 may output sound signals to the outside of the electronic device 301. The sound output device 355 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, or projector. According to an embodiment, the display device 360 may include touch circuitry adapted to detect a touch, or sensor circuitry (e.g., a pressure sensor) adapted to measure the intensity of force incurred by the touch. The display device 360 can be similar to the display 255 of FIG. 2.

The audio module 370 may convert a sound into an electrical signal and vice versa. According to an embodiment, the audio module 370 may obtain the sound via the input device 350, output the sound via the sound output device 355, or output the sound via a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The sensor module 376 can be similar to the sensors 265 of FIG. 2.

The interface 377 may support one or more specified protocols to be used for the electronic device 101 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication.

According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as BLUETOOTH, wireless-fidelity (Wi-Fi) direct, UWB, or infrared data association (IrDA)) or the second network 399 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB).

According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302 or 304. For example, if the electronic device 301 may perform a function or a service automatically, or in response to a request from a user or another device, the electronic device 301, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Although FIG. 3 illustrates one example of the electronic device 301 in the network environment 300, various changes can be made to FIG. 3. For example, various components in FIG. 3 can be combined, further subdivided, or omitted and additional components can be added according to particular needs. As a particular example, the processor 320 can be further divided into additional processors, such as one or more central processing units (CPUs), one or more graphics processing units (GPUs), one or more neural networks, and the like. Also, while FIG. 3 illustrates the electronic device 301 configured as a mobile telephone, tablet, or smartphone, the electronic device 301 can be configured to operate as other types of mobile or stationary devices.

Figure 4A:
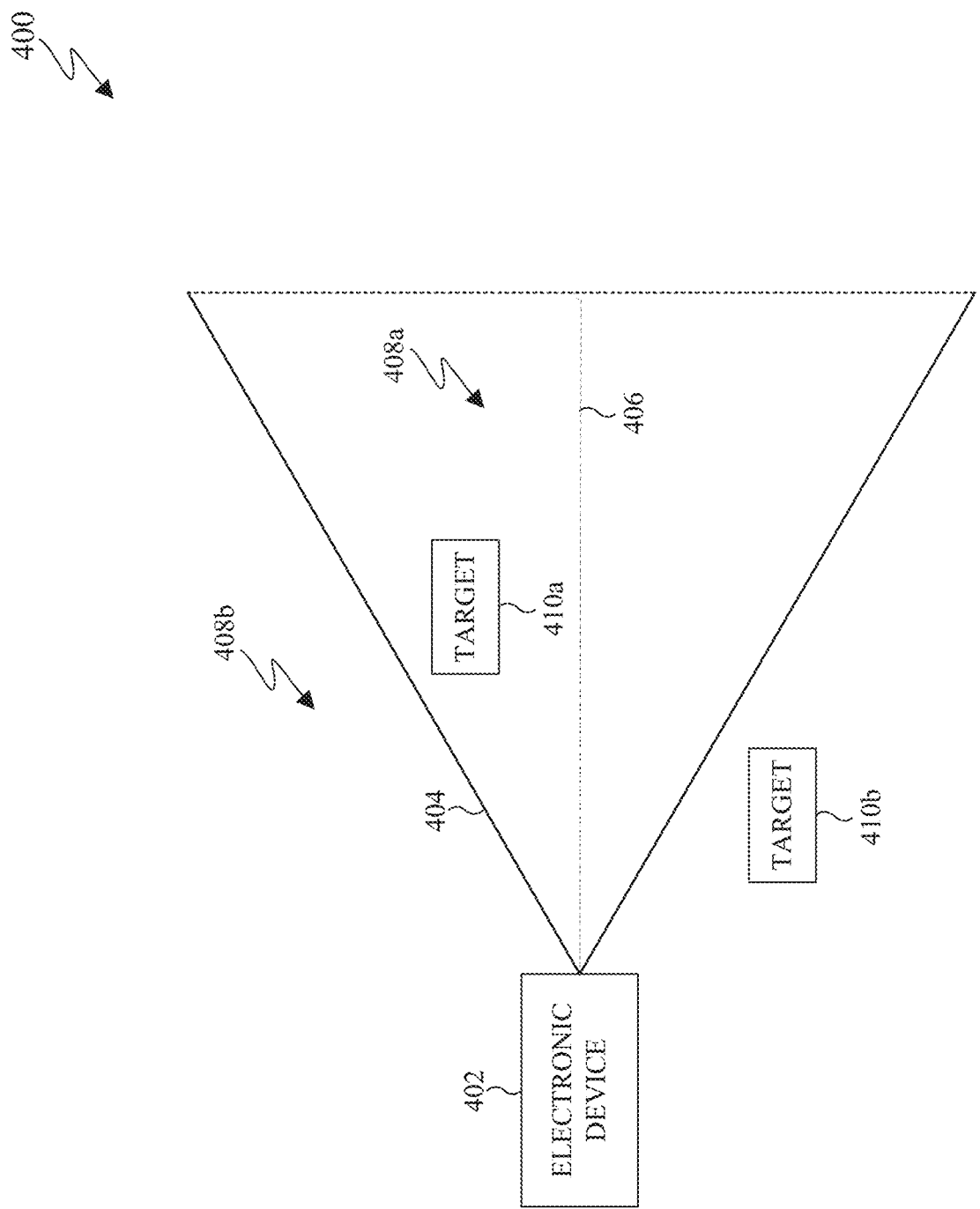
FIG. 4A illustrates an example diagram of a determination of whether target device is within a field of view (FoV) of an electronic device according to embodiments of the present disclosure.
Figure 4B:
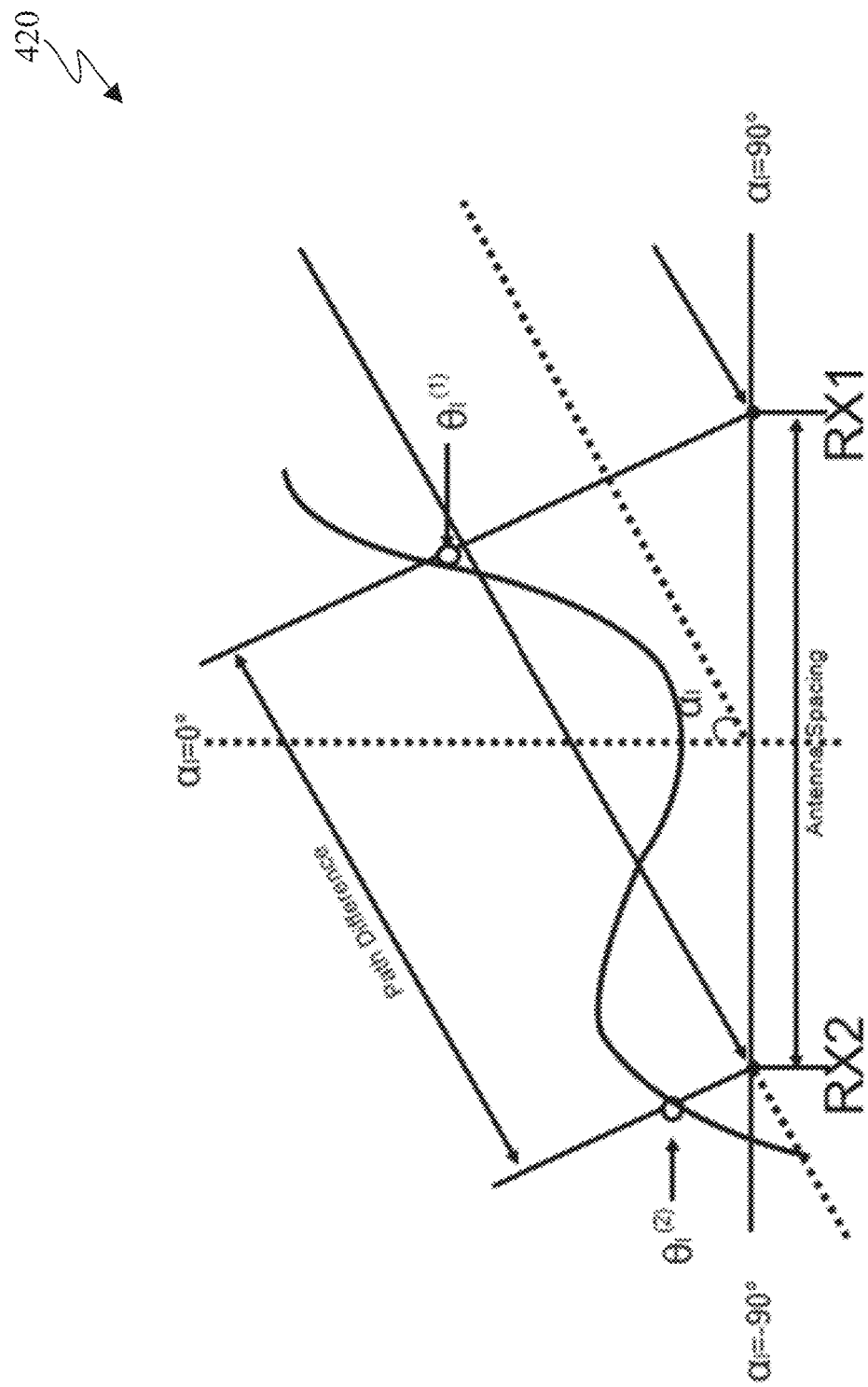
FIG. 4B illustrates a diagram of an electronic device identifying angle of arrival (AoA) measurements of signals from an external electronic device according to embodiments of the present disclosure.
Figure 4C:
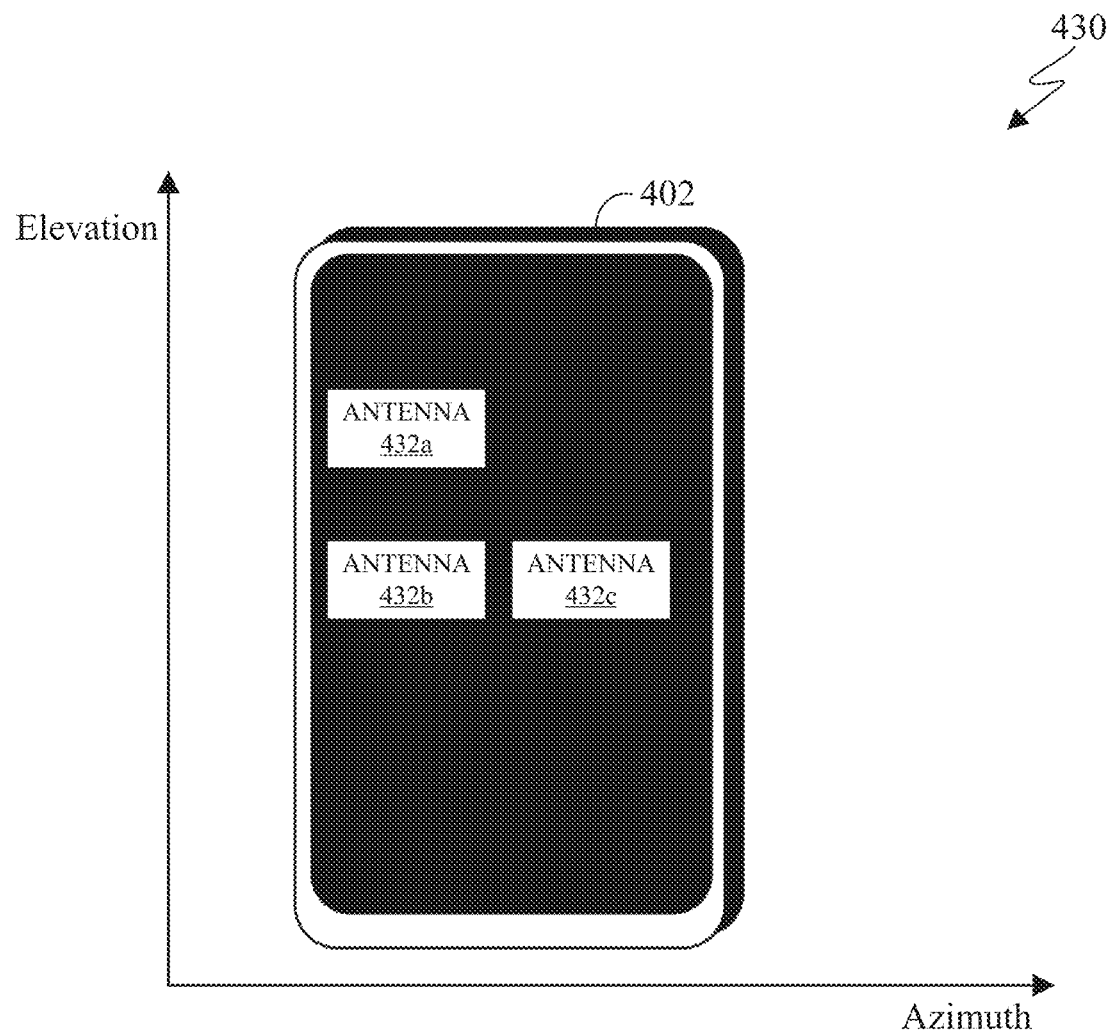
FIG. 4C illustrates a diagram of example antenna placements according to embodiments of the present disclosure.
Figure 4D:
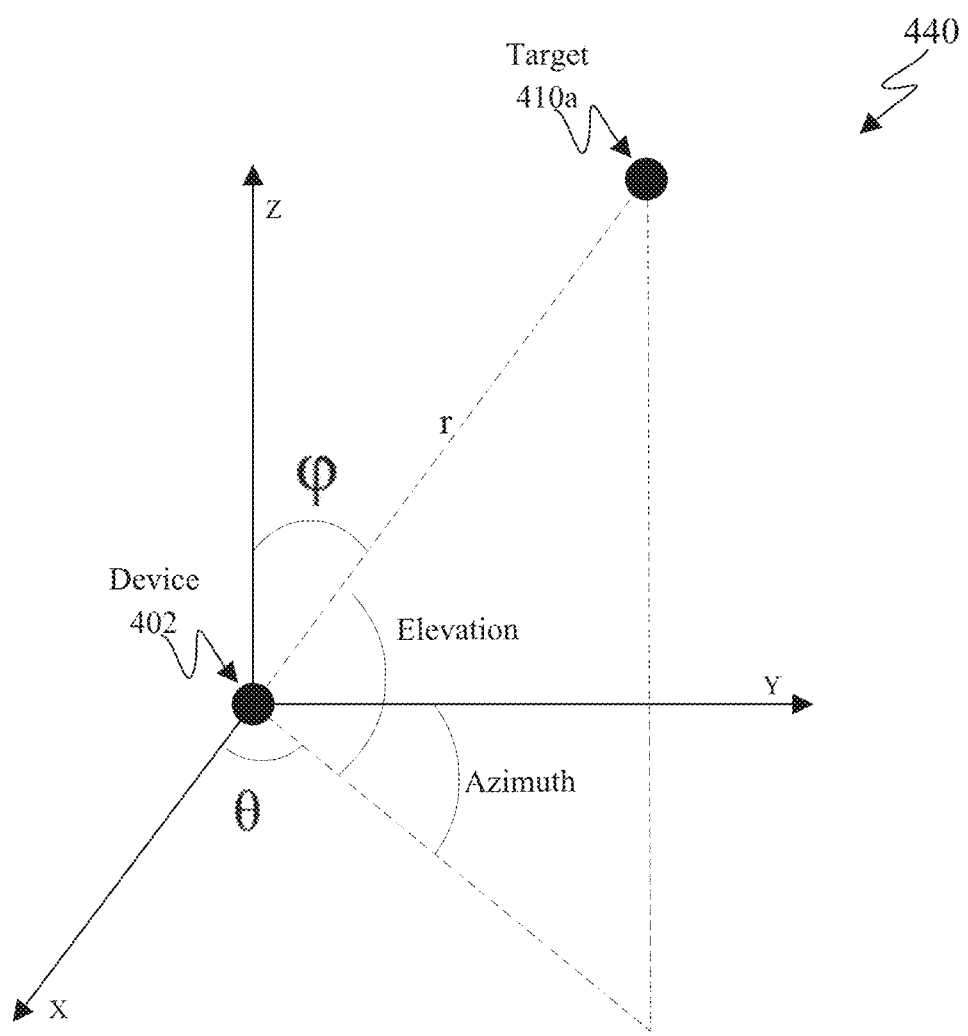
FIG. 4D illustrates an example coordinate system according to embodiments of the present disclosure.
Figure 4E:
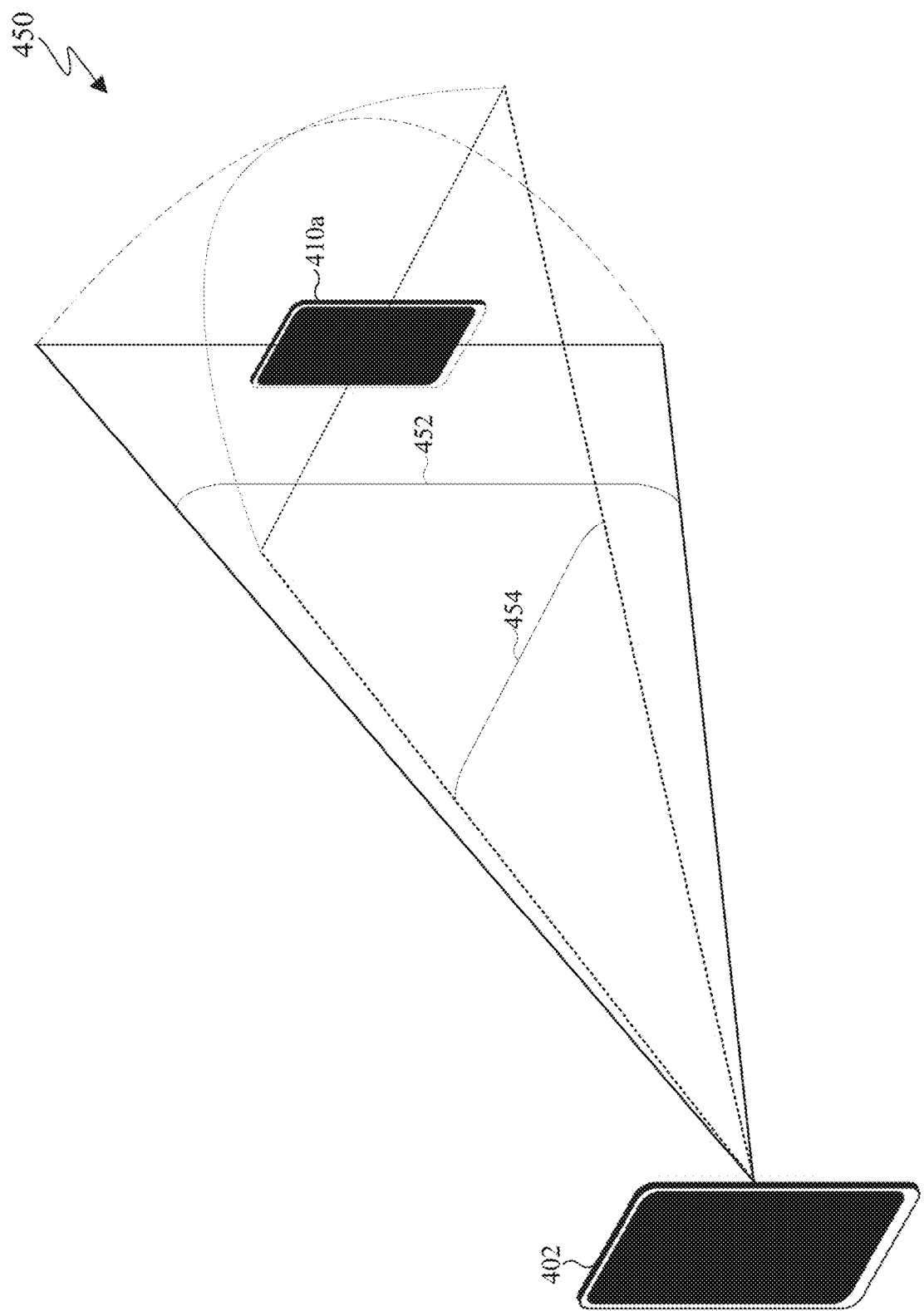
FIG. 4E illustrates an example diagram of an electronic device determining that an external electronic device is within an azimuth FoV and an elevation FoV according to embodiments of the present disclosure.

FIG. 4A illustrates an example diagram 400 of a determination of whether target device is within a FoV of an electronic device according to embodiments of the present disclosure. FIG. 4B illustrates a diagram 420 of an electronic device identifying AoA measurements of signals from an external electronic device according to embodiments of the present disclosure. FIG. 4C illustrates a diagram 430 of example antenna placements according to embodiments of the present disclosure. FIG. 4D illustrates an example coordinate system 440 according to embodiments of the present disclosure. FIG. 4E illustrates an example diagram 450 of an electronic device determining that an external electronic device is within an azimuth FoV and an elevation FoV according to embodiments of the present disclosure.

The electronic device 402 of FIGS. 4A, 4C, 4D, and 4E, the target device 410a of FIGS. 4A, 4D and 4E, and the target device 410b of FIG. 4A can be any one of the client devices 106-114 and can include internal components similar to that of electronic device 200 of FIG. 2 and the electronic device 301 of FIG. 3. For example, the target device 410a and the target device 410b (collectively target device 410) can be a phone (such as the mobile device 108) or a tag attached to a certain object. In certain embodiments, the electronic device 402 is identifies the location of a target device 410 with respect to some FoV of the electronic device 402, such as the FoV 408a, as shown in FIG. 4A. In other embodiments, a remote server, such as the server 104 if FIG. 1 or the server 308 of FIG. 3, receives information from the electronic device 402 and determines whether a target device 410 is within a FoV of the electronic device 402, such as the FoV 408a. The electronic device 402, the target device 410 can be any wireless-enabled device such as the mobile device 108, a smartphone, a smart watch, a smart tag, a tablet computer 114, a laptop computer 112, a smart thermostat, a wireless-enabled camera, a smart TV, a wireless-enabled speaker, a wireless-enabled power socket, and the like. Based on whether a target device is within the FoV of the electronic device can be used to help a user finding a lost personal item in a nearby area, displaying contextual menu around the electronic device 402 seen through an AR application. The determination of whether the target device 410a or the target device 410b is within the field of view of the electronic device 402 can be performed by any one of the client devices 106-114, the server 104 of FIG. 1, The any one of the electronic devices 301, 302, 304 of FIG. 3, the server 308 of FIG. 3, or the electronic device 402.

In certain embodiments, the electronic device 402, the target device 410a, and the target device 410b can include a transceiver, such as the measuring transceiver 270 of FIG. 2, a UWB transceiver, or the like. Any other suitable transceiver, receiver, or transmitter may be used. Range and AoA information is obtained based on the exchange of signals between the electronic device 402, the target device 410a, and the target device 410b.

As shown in FIG. 4A, the determination of whether an external electronic device (such as either of the target devices 410a or 410b) is within a FoV of another electronic device (such as the electronic device 402) is based on the size and shape of a FoV. A portion of the environment around the electronic device 402 is illustrated as FoV 408a, while another portion of the environment around the electronic device 402 is illustrated as outside FoV 408b. The boundary 404 represents an approximate boundary between the FoV 408a and outside the FoV 408b. The boresight 406 is the center of the FoV 408a. The boresight 406 can be the axis of maximum gain (such as maximum radiated power) of an antenna (e.g., a directional antenna) of the electronic device 402. In some instances, the axis of maximum gain coincides with the axis of symmetry of the antenna of the electronic device 402. For example, for axial-fed dish antennas, the antenna boresight is the axis of symmetry of the parabolic dish, and the antenna radiation pattern (the main lobe) is symmetrical about the boresight axis. Most boresight axes are fixed by their shape and cannot be changed. However, in some implementations, the electronic device 402 includes one or more phased array antennas that can electronically steer a beam, change the angle of the boresight 406 by shifting the relative phase of the radio waves emitted by different antenna elements, radiate beams in multiple directions, and the like.

The FoV of an electronic device (such as the FoV 408a of the electronic device 402 of FIG. 4A) is a range of angles around the boresight 406, within which the target device (such as the target devices 410a and 410b) can be defined as being present based on UWB measurements or other measurements. The size and shape of a FoV can vary based on environmental conditions and the hardware of the electronic device itself.

A target device is considered to be within a FoV when it is within predefined range (distance) from the electronic device. Range represents the distance an external device is from a primary electronic device. In addition to range (distance), angle features are used to identify a location of an external electronic device. Angle features, such as AoA, indicates a relative angle that the external device is from the target device (or external electronic device). AoA features are the angle-of-arrival measurements of the second device with respect to the first device, and available when the first device has multiple UWB antennas. For a pair of antennas, the phase difference of the signal coming to each antenna from the second device can be measured, and then be used to determine the AoA of the second device.

As illustrated in the diagram 420 of FIG. 4B, the phase difference among antennas is used to extract the AoA information from UWB measurements. For example, AoA is calculated based on the phase difference of between the two antennas, that of RX1 and RX2. Since the distance between the two antennas is fixed, the AoA of a received signal can be identified using the measured phase difference between two antennas.

In certain embodiments, an electronic device can be equipped with more than more pairs of antennas. A single antenna pair can measure AoA with respect to one plane. Two or more antenna pairs can measure AoA with respect to multiple planes. For example, two antenna pairs can measure AoA in both azimuth and elevation angles. For instance, one pair of antennas is placed in the horizontal direction to measure the angle of arrival in the horizontal plane, (denoted as the azimuth angle), while the other pair of antennas is placed in the vertical direction to measure the angle of arrival in the vertical plane (denoted as the elevation angle). This is illustrated in the diagram 430 of FIG. 4C.

FIG. 4C illustrates antenna orientations of an electronic device 402 that includes multiple antennas for identifying the azimuth AoA and the elevation AoA. That is, antenna 432a and antenna 432b are positioned in the vertical direction for measuring AoA in the elevation direction, while the antenna 432b and antenna 432c are positioned in the horizontal direction for measuring AoA in the azimuth direction. For example, a signal received from antenna 432a and antenna 432b can be used to generate AoA measurements in elevation. Similarly, a signal received from antenna 432b and antenna 432c can be used to generate AoA measurements in azimuth.

In certain embodiments, an antenna can be used in multiple antenna pairs (such as the antenna 432b of FIG. 4C). In other embodiments, each antenna pair can include separate antennas. The locations of the antennas as shown in the diagram 430 are for example and other antenna placements, locations, and orientations are possible.

As shown in FIG. 4D, the coordinate system 440 can be used to find the distance and the relative angle that the target device 410a is from the electronic device 402. The distance and the relative angle between the target device 410a and the electronic device 402 correspond to the range and AoA measurements when the target device 410a is within the FoV of the electronic device 402. The coordinate system 440 illustrates the azimuth angle and the elevation angle between the two devices. As illustrated, the azimuth angle is the horizontal angle between the electronic device 402 and the target device 410a. Similarly, the elevation angle is the vertical angle between the electronic device 402 and the target device 410a. The coordinate system 440 illustrates the range, r, (distance) between the electronic device 402 and the target device 410a.

As shown in FIG. 4E, the diagram 450 includes an electronic device 402 and a target device 410a. The electronic device 402 can determine whether the target device 410a is within its 3D FoV. A target device is in a 3D FoV when it is within a FoV in both azimuth and elevation. For example, the electronic device 402 can include a measuring transceiver (similar to the measuring transceiver 270 of FIG. 2, a UWB sensor, or the like) with antenna pairs oriented in a similar manner to as illustrated in FIG. 4C. Measurements obtained from a UWB sensor with two antenna pairs can include range (distance), AoA elevation 432, and AoA azimuth 434.

Since FoV can be any limit of angles in azimuth and elevation within which the target can be defined as identifiable or present. The FoV limit in azimuth and elevation may or may not be the same. In certain embodiments, if (i) there is a direct line of sight (LoS) between the electronic device 402 and a target (such as the target device 410a or 410b), and (ii) range and AoA measurements are good, then to identify the presence of target as in FoV or out of FoV can be performed based on AoA measurements in azimuth and elevation. However, many times, the measurements are corrupted by multipath and NLoS scenarios. Non-isotropic antenna radiation patterns can also result in low quality of AoA measurements. For example, when the signal received from the direct path between the target device (such as the target device 410b) and the device is weak, it is possible that the signal received for the reflected path, based on the environment, can be strong enough to be used for generating the range and AoA measurements. The generated range and AoA measurements which are based on a reflected signal would give false results of where the target is. For example, the target device 410b can transmit signals to the electronic device 402. If the electronic device 402 uses a reflected signal (instead of a direct signal) the electronic device 402 can incorrectly determine that the target device 410b is located within the FoV 408a instead of its actual location which is outside the FoV 408b.

Therefore, embodiments of the present disclosure address problems for determining whether the target device is in the FoV of the electronic device when the UWB measurements between them may not be very accurate. Embodiments of the present disclosure describe methods for identifying whether the target device is within the 3D FoV of the electronic device 402 (such as the target device 410a) or whether a target device is outside the FoV of the electronic device 402 (such as the target device 410b).

Figure 5A:
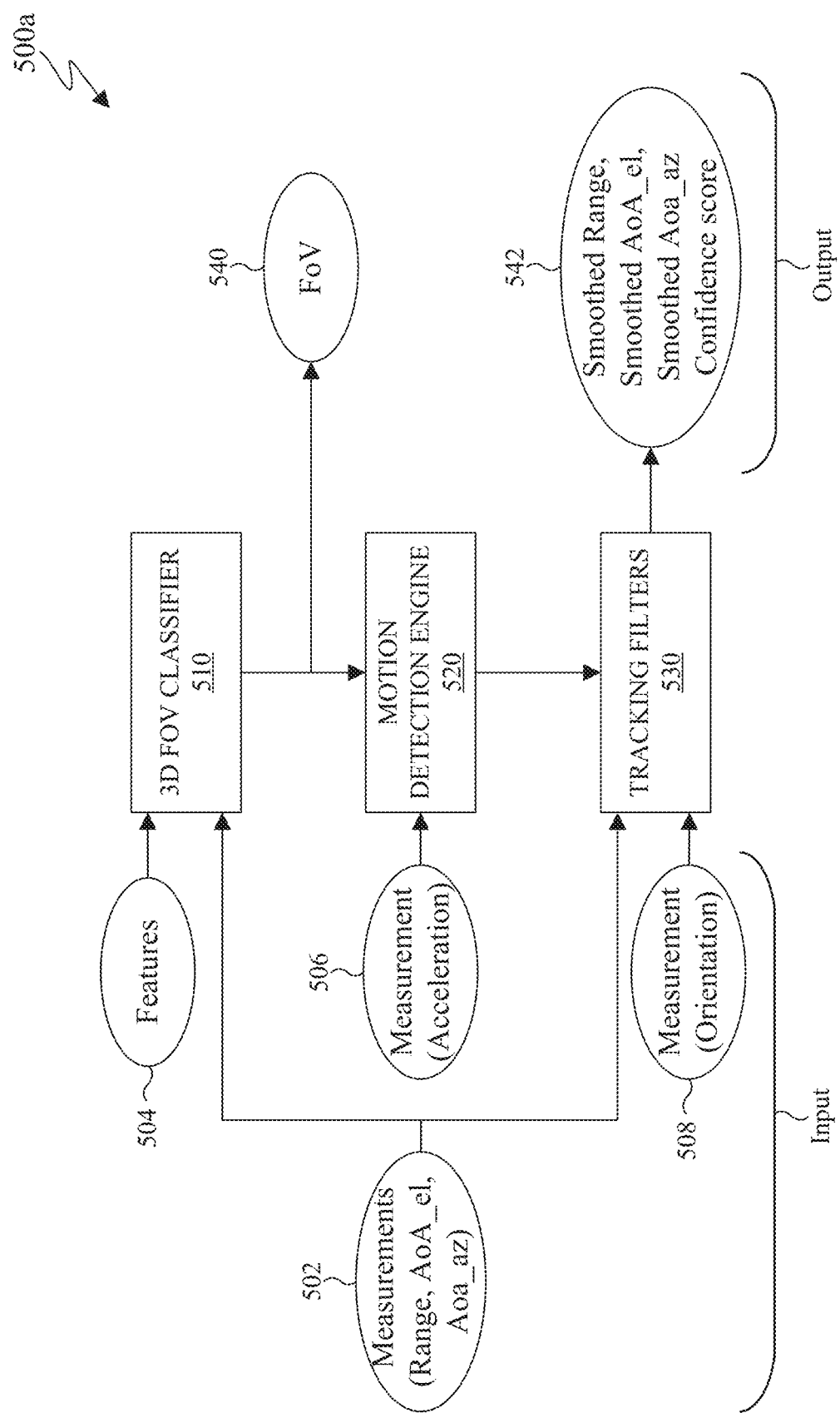
FIGS. 5A, 5B, and 5C illustrate signal processing diagrams for field of view determination according to embodiments of the present disclosure.
Figure 5B:
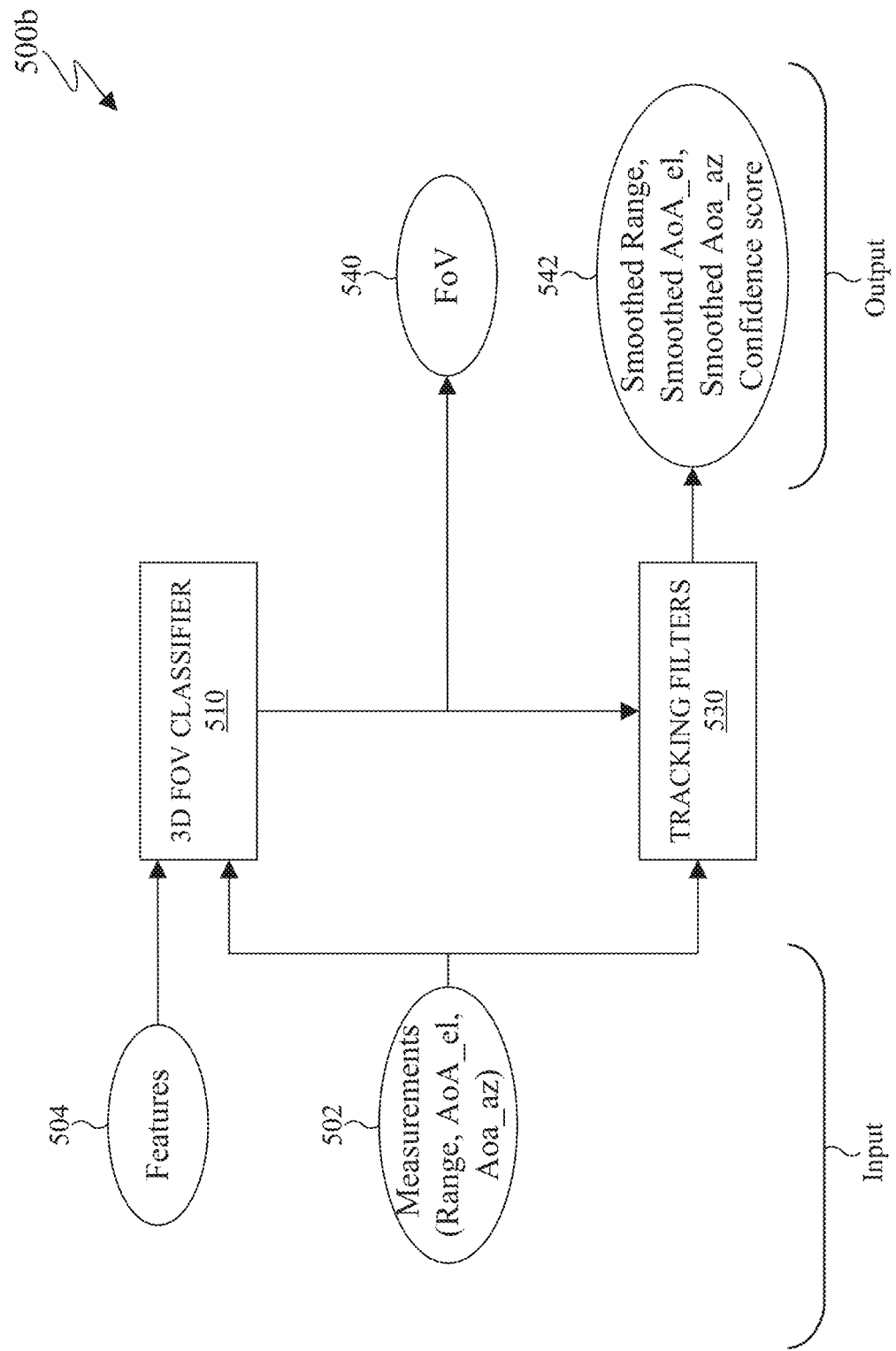
Figure 5C:
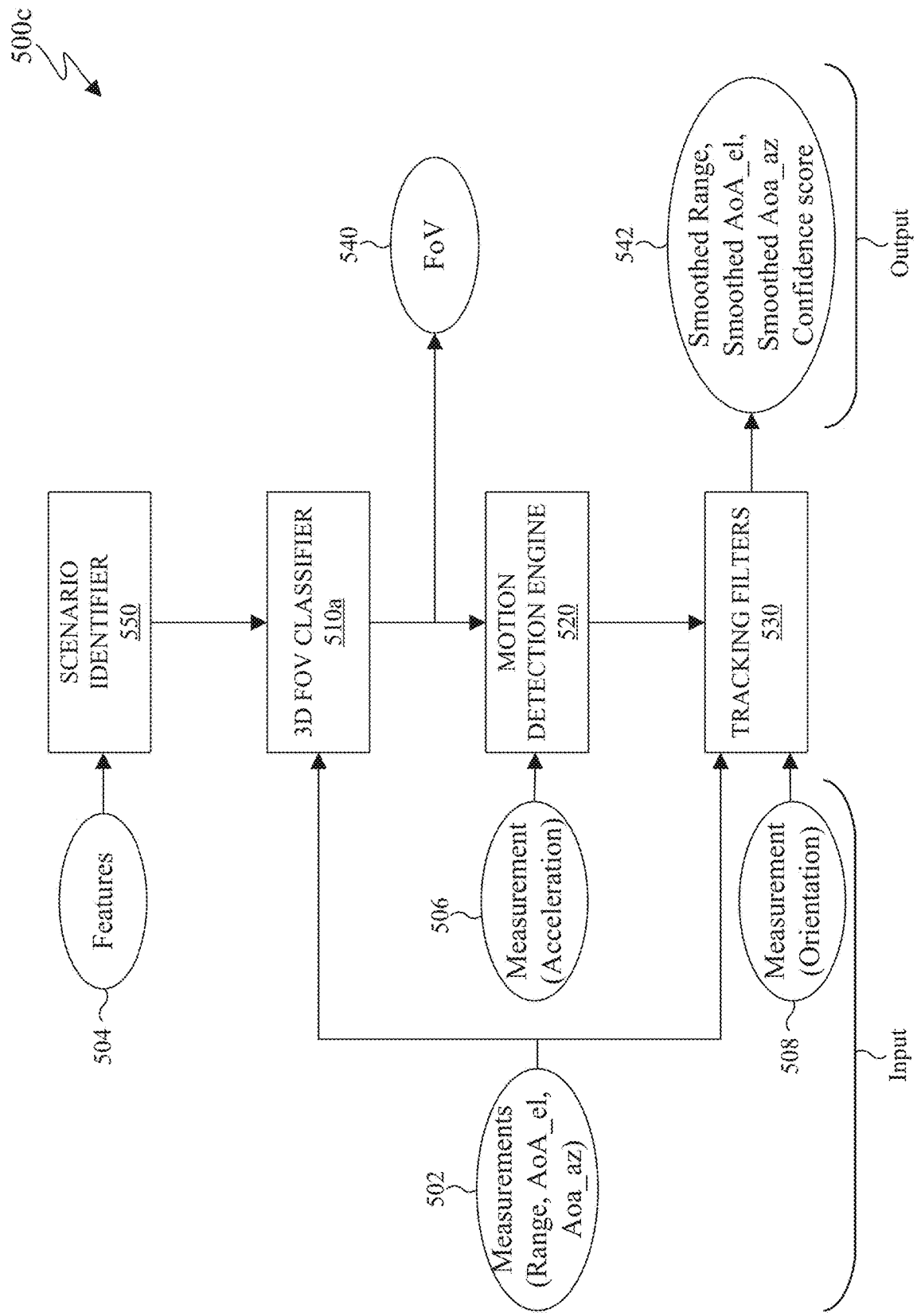

FIGS. 5A, 5B, and 5C illustrate signal processing diagrams 500a, 500b, and 500c, respectively, for field of view determination according to embodiments of the present disclosure. In certain embodiments, the signal processing diagrams 500a, 500b, and 500c can be performed by any one of the client devices 106-114 of FIG. 1, any of the electronic devices 301, 302 and 304 of FIG. 3, the server 104 of FIG. 1, the server 308 of FIG. 3, and can include internal components similar to that of electronic device 200 of FIG. 2 and the electronic device 301 of FIG. 3.

As discussed above, post processing can be performed to improve the quality of measurements received from transceivers and output a FoV decision regarding the target device along with smoothed range and AoA. FIGS. 5A, 5B, and 5C describe various signal processing diagrams for improving the quality of measurements received from transceivers and determining whether a target device is within the FoV of the electronic device.

As illustrated in FIG. 5A, the signal processing diagram 500a includes a 3D FoV classifier 510, a motion detection engine 520, and a tracking filter operation 530. In certain embodiments, if the electronic device (such as the electronic device 402) does not include a motion sensor (such as when the electronic device 200 does not include a sensor 265), then the motion detection engine 520 can be omitted such as illustrated by the signal processing diagram 500b of FIG. 5B. The motion sensor can gyroscope, accelerometer and magnetometer (inertial measurement unit), and the like. The motion detection engine 520 can cause the tracking filter operation 530 to reset, upon detecting a motion that is larger than a threshold.

In certain embodiments, the electronic device (such as the electronic device 402) can include multiple 3D FoV classifiers (including the 3D FoV classifiers). For example, the multiple 3D FoV classifiers can be used depending on certain criteria, such as, range, environment, and the like. As shown in FIG. 5C, the signal processing diagram 500c includes a scenario identifier 550. If an electronic device includes multiple FoV classifiers, then the scenario identifier 550 identifies the scenario (such as short or long range, LoS or NLoS). Then depending on the identified scenario identified, a particular 3D FoV classifier that is trained on that particular scenario, such as the 3D FoV classifiers 510a, is used to do the prediction. For instance, a different 3D FoV classifier can be used for different scenarios (e.g., different range measurements between the device and target). The 3D FoV classifier 510a can be the same or similar to the 3D FoV classifier 510 of FIGS. 5A and 5B. The scenario identifier 550 is described in FIG. 13 and its corresponding description, below.

The signal processing diagrams 500a, 500b, and 500c receive various inputs, such as measurements 502, features 504, measurement 506, and measurement 508. The measurements 502 include range, and AoA measurements based on the received signals that are communicated between the electric device and the target device. The AoA measurements include both AoA in azimuth (AoA_az) and AoA in elevation (AoA_el). The AoA measurements can be in the form of degrees, radians, or any other angle based metric. The measurement 506 includes acceleration of the electronic device. Similarly, the measurement 508 includes orientation of the electronic device. The acceleration and orientation can be detected by a motion sensor (if present). It is noted that the signal processing diagram 500b does not include measurement 506 or measurement 508 since the signal processing diagram 500b corresponds to an electronic device that does not include a motion sensor or a sensor that is capable of detecting acceleration.

Figure 7:
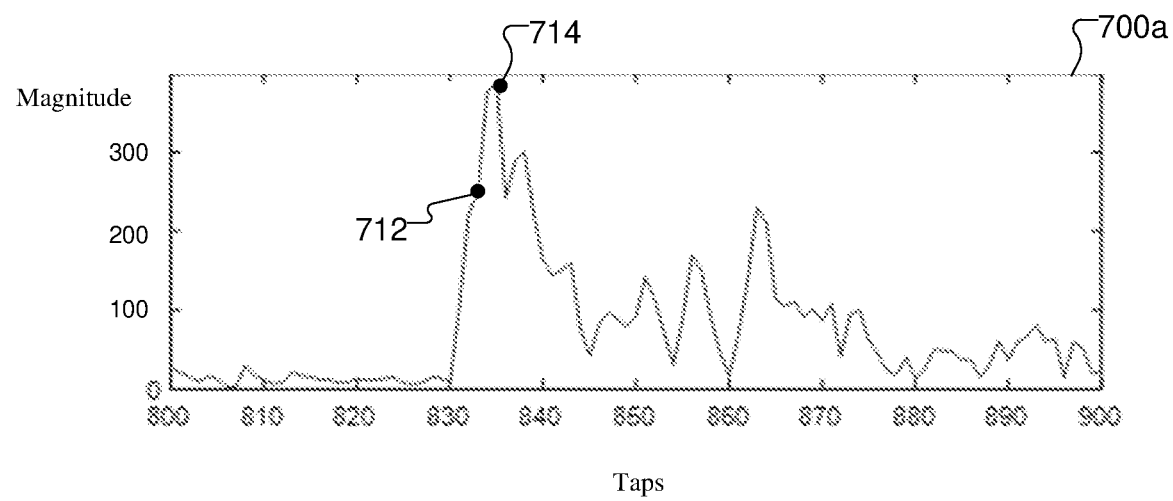
FIG. 7 illustrates example channel impulse response (CIR) graphs for an initial FoV determination according to embodiments of the present disclosure.
Figure 7:
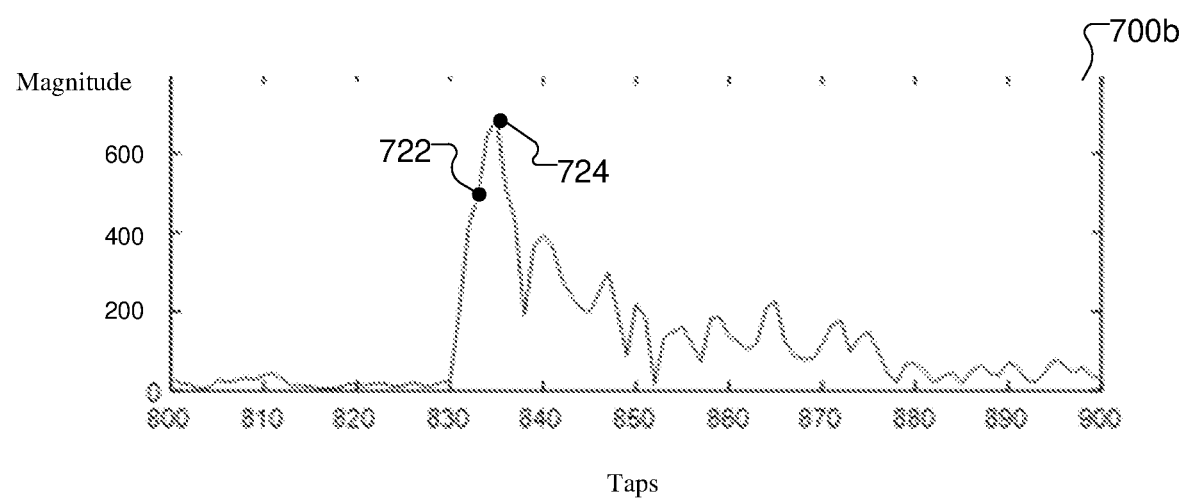

The features 504 include features (such as UWB features) based on the received signals that are communicated between the electric device and the target device. In certain embodiments, the features 504 are derived from CIR. Example features can include, but are not limited to: signal-to-noise ratio (SNR) of the first peak (in dB, in linear domain or with other relative strength indicator) from the CIR, SNR of the strongest peak (in dB, in linear domain or with other relative strength indicator) from the CIR, difference between the SNR of strongest and first peak (in dB, in linear domain or with other relative strength indicator), received signal strength (in dB or dBm), and the time difference between the first and strongest peak (in nsec, number of time samples or other time based metrics). FIG. 7 illustrates CIR graphs depicting the first peak and the strongest peak.

Figure 6:
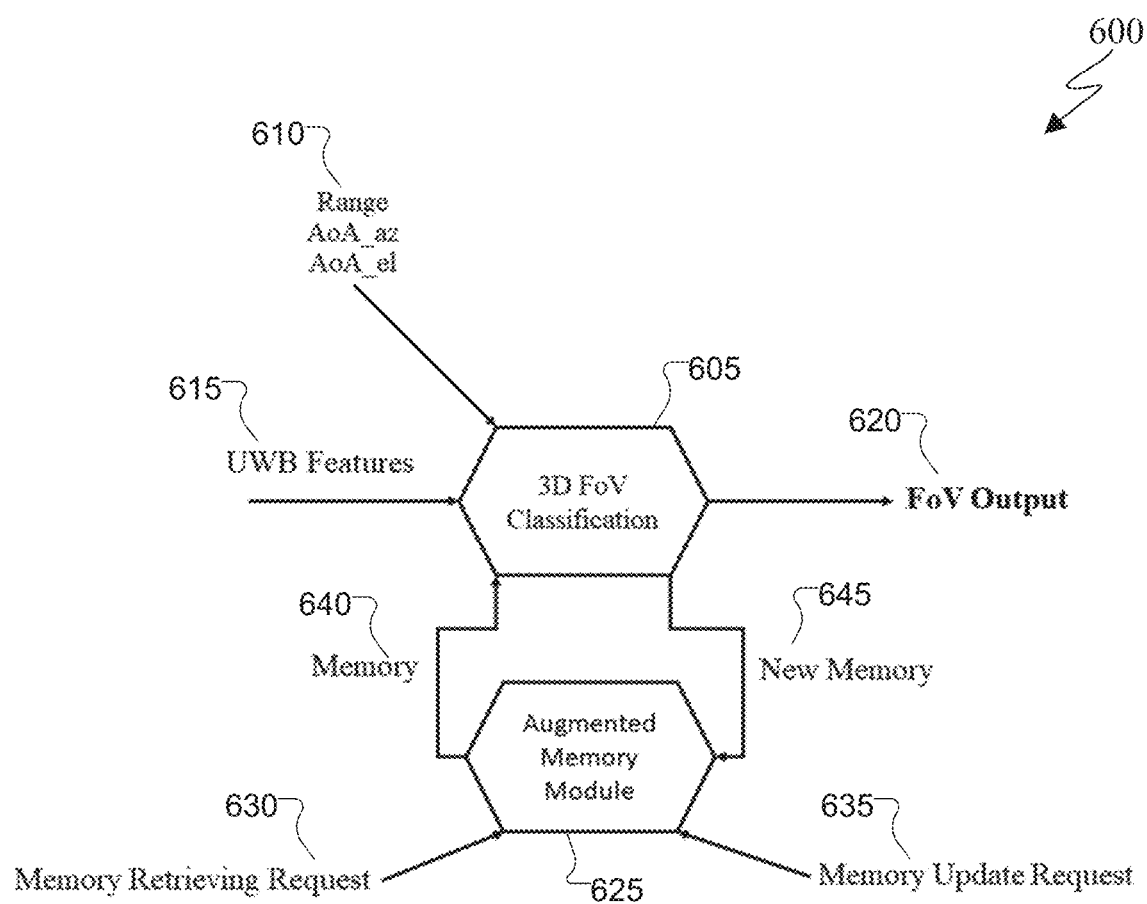
FIG. 6 illustrates an example post processor according to embodiments of the present disclosure.

FIG. 6 illustrates an example post processor according to embodiments of the present disclosure. The embodiment of the post processor 600 shown in FIG. 6 is for illustration only. Other embodiments could be used without departing from the scope of the present disclosure.

In certain embodiments, a post processor can be used to improve the quality of measurements received from UWB transceivers and output the 3D FoV decision regarding the target along with range and AoA in azimuth and elevation. A 3D FoV classifier 605 is used to perform 3D FoV or out-of-FoV prediction about the target using UWB measurements 610 and features 615. UWB measurements 610 include range, AoA in azimuth denoted by AoA_az, and AoA in elevation denoted by AoA_el. UWB features 615 are extracted from the Channel Impulse Response (CIR).

The 3D FoV classifier 605 receives UWB features 615 and UWB measurements 610, namely Range, AoA_az, and AoA_el, information in order to make a FoV prediction 620. Additionally, 3D FoV classifier 605 also receives the memory state from the Augmented Memory Module (AMM) 625. Herein, memory refers to a set of encoded parameters and information that are learned and stored to represent the characteristics of a specific environment. The AMM 625 takes in the environmental parameters, and then identifies whether the environment has been observed before to issue the appropriate memory state. The AMM 625 receives a memory retrieving request 630, a memory update request 635, or both. Based on the memory retrieving request 630, the memory update request 635, or both, the AMM 625 provides a memory 640 information to 3D FoV classifier 605 and receives new memory 645 information from 3D FoV classifier 605.

The 3D FoV classifier 605 can perform the 3D FoV classification using deterministic logic, a classical machine learning classifier, or a deep learning classifier. In certain embodiments, the classification problem is defined as labeling the target to be in 'FoV' or 'out-of-FoV' of the device based on UWB measurements 610. A target is labeled as FoV if the target lies within both azimuth and elevation FoV, otherwise the target is labeled as 'out-of-FoV'. In certain embodiments, a Recurrent Neural Network is used to perform classification. In certain embodiments, the classifiers that can be used include, but are not limited to, K-Nearest Neighbors (KNN), Support Vector Machine (SVM), Decision Tree, Random Forest, Neural Network, Convolutional Neural Network (CNN).

The 3D FoV classifier 605 performs data collection and data labeling. Training data can be collected by obtaining multiple measurements between the device and the target in FoV and out-of-FoV in both LOS and NLOS setup. To add variation to the data, measurements can be taken at different ranges between the device and the target up to a maximum usable range. Additionally, the environment of data collection can be varied, for example, data can be collected in an open space environment or in a cluttered environment prone to multipath. More variations can be added by changing the tilting angle of the device and target, and by rotating the target at different angles in azimuth and elevation. Data for the UWB measurements 610 is collected for all combinations of FoV and out-of-FoV of both azimuth and elevation. All the UWB measurements 610 can be labeled as per the application depending on which scenario or setup is required to be labeled as FoV and which one is supposed to be out-of-FoV. In certain embodiments, the UWB measurements 610 are labeled as out-of-FoV in at least the following scenarios: (1) when the target lies outside the FoV of both azimuth and elevation; (2) when the target lies in the FoV of azimuth but outside the FoV of elevation; or (3) when the target lies in the FoV of elevation but outside the FoV of azimuth. In some instances, only the UWB measurements 610 corresponding to when the target lies within the FoV of both azimuth and elevation are labeled as FoV.

The UWB features 615 from UWB measurements 610 that can be used for classification include (a) statistics (e.g., mean, variance) on the measurements themselves (e.g., range, raw AoA measurements), and/or (b) features from the CIR of the wireless channel between the device and the target. Variance of some of the UWB features 615, for example variance of range, AoA, over a certain sliding window carry information useful for FoV classification. If the window size is K (typically 3-7 samples), a buffer is maintained that stores previous K measurements of the features over which the variance is calculated and used in the feature vector. Instead of variance, other metrics that can measure the spread of the features can also be used.

FIG. 7 illustrates example CIR graphs 700a and 700b for an initial FoV determination according to embodiments of the present disclosure. In certain embodiments, the CIR graphs 700a and 700b can be created by any one of the client devices 106-114 or the server 104 of FIG. 1 and can include internal components similar to that of electronic device 200 of FIG. 2 and the electronic device 301 of FIG. 3.

The CIR graphs 700a and 700b of FIG. 7 represent CIRs from two different antennae of the electronic device depending on the orientation of the device. For example, the CIR graph 700a represents the CIR from one antenna of an electronic device and the CIR graph 700b represents the CIR from another antenna of the same electronic device. The two CIRs can be denoted as CIR_1 and CIR_2.

In certain embodiments, if the electronic device is in portrait mode (such as illustrated in the diagram 430 of FIG. 4C), then CIR_1 and CIR_2 correspond to the CIRs from antenna 432b and antenna 432c (or antenna 432c and antenna 432b). Similarly, if the electronic device is in landscape mode, then CIR1 and CIR2 correspond to the CIRs from antenna 432a and antenna 432b (or antenna 432b and antenna 432a). The determination of portrait or landscape mode can be obtained from IMU sensors.

The CIR graphs 700a and 700b show the signal power vs. tap index of a received signal. The measurements 502 (such as range, AoA_az, and AoA_el) can be calculated based on the earliest peak with sufficient SNR (relative to floor noise) in the CIR graphs 700a and 700b. The features 504 can also be derived from the CIR graphs 700a and 700b. The 3D FoV classifier 510 (and the 3D FoV classifier 510a) can use one or more of measurements 502 and the features 504 to classifier whether the external electronic device is in FoV or out of the FoV. The CIR features of the features 504 can include: (i) absolute strength of one or multiple peaks in CIR, normally represented by SNR; (ii) tap indices of one or multiple peaks in CIR, normally represented by index number; (iii) difference in signal strength among multiple peaks in CIR, normally represented by SNR (iv) time differences between multiple peaks in the CIR; (v) phase relationship among multiple antennas used to generate the AoA information; and (vi) other features derived from the amplitude and phase around the peaks.

In certain embodiments, various feature vectors can be generated by the measurements 502 and the features 504. The 3D FoV classifier 510 then uses the feature vectors from for generating the initial prediction of whether the target device is within the FoV of the electronic device. For example, a generated feature vector that includes one or more of the measurements 502 and the features 504 could be expressed as:

Feature Vector=[range, AoA_az, PDoA1, PDoA1Idx, AoA_el, PDoA2, PDoA2Idx, SNRFirst1, SNRMain1, FirstIdx1, MainIdx1, SNRFirst2, SNRMain2, FirstIdx2, MainIdx2, var_aoa_win3, var_aoa_win7]  (1)

Feature Vector=[AoA_az, PDoA1, PDoA1Idx, AoA_el, PDoA2, PDoA2Idx, SNRFirst1, SNRMain1, FirstIdx1, MainIdx1, SNRFirst2, SNRMain2, FirstIdx2, MainIdx2, var_aoa_win3, var_aoa_win7, var_aoa_el_win3, var_aoa_el_win7 ToAGap1, ToAGap2]  (2)

Feature Vector=[range, AoA_az, PDoA1, PDoA1Idx, AoA_el, PDoA2, PDoA2Idx, SNRFirst1, SNRMain1, FirstIdx1, MainIdx1, SNRFirst2, SNRMain2, FirstIdx2, MainIdx2, var_range_win3, var_aoa_win3, var_aoa_win7, var_aoa_el_win5, var_snrfirst1_win5, var_snrfist2_win5]  (3)

Feature Vector=[range, AoA_az, AoA_el, SNRFirst1, SNRMain1, FirstIdx1, MainIdx1, SNRFirst2, SNRMain2, FirstIdx2, MainIdx2, var_aoa_win3, var_aoa_win7]  (4)

Feature Vector=[range, AoA_az, AoA_el, SNRFirst1, SNRMain1, FirstIdx1, MainIdx1, SNRFirst2, SNRMain2, FirstIdx2, MainIdx2, var_range_win3, var_aoa_win3, var_aoa_win7, var_aoa_el_win5, var_snrfirst1_win5, var_snrfist2_win5]  (5)

Feature Vector=[range, AoA_az, PDoA1, PDoA1Idx, AoA_el, PDoA2, PDoA2Idx, SNRFirst1, SNRMain1, FirstIdx1, MainIdx1, SNRFirst2, SNRMain2, FirstIdx2, MainIdx2, var_aoa_win3, var_aoa_win7, ToAGap1, ToAGap2]  (6)

Feature Vector=[range, AoA_az, PDoA1, PDoA1Idx, AoA_el, PDoA2, PDoA2Idx, SNRFirst1, SNRMain1, FirstIdx1, MainIdx1, SNRFirst2, SNRMain2, FirstIdx2, MainIdx2, var_aoa_win3, var_aoa_win7, ToAGap1, ToAGap2, min(SNRMain1-SNRFirst1, SNRMain2-SNRFirst2)]  (7)

Here, range, AoA_az, and AoA_el represent the measurements 502. For example, range is the measured distance from the electronic device to the external electronic device. Additionally, AoA_az corresponds to measurements from one antenna pair (such as the antenna 432b and the antenna 432c of FIG. 4C) and AoA_el corresponds to measurements from another antenna pair (such as the antenna 432a and the antenna 432b of FIG. 4C). The features "PDoA1 and "PDoA2" represent the phase difference of arrival from the two different pairs of antennae. The features "PDoA1Idx" and "PDoA2Idx" represent the index of phase difference of arrival from the two different pairs of antennae. The features "SNRFirst1" and "SNRFirst2" represent the first peak strength from CIR1 and CIR2 (such as the first peak strength 712 or 722 of FIG. 7). The features "FirstIdx1" and "FirstIdx2" represent the index of first peak from CIR1 and CIR2. The features "SNRMain1" "SNRMain2" represent the strongest peak strength from CIR1 and CIR2 (such as the strongest peak strength 714 or 724 of FIG. 7). The features "MainIdx1" and "MainIdx2" represent the index of strongest peak from CIR1 and CIR2. The expression "var_aoa_win3" is a first variance of AoA_az in a window size of 3. The purpose of "var_aoa_win3," is to capture the variance of AoA_az in short time duration, other size is also possible. The expression "var_aoa_win7" is a second variance of AoA_az in a window size of 7. The purpose of "var_aoa_win7" is to capture the variance of AoA_az in longer time duration. Other window size that is larger compared to the first variance of AoA_az is also possible. The features "ToAGap1" and "ToAGap2" are the difference between first peak strength 712 and strongest peak strength 714 of CIR1 and CIR2, respectively. As mentioned previously, the selection of antennae for features obtained from CIR1 and CIR2 can depend on the orientation of the device, which can be obtained from the IMU. Other ordering or subset of the features in the feature vector is possible. The difference between the strongest peak strength and first peak strength is also used as a feature in the feature set. Variance of range, AoA_el, SNRFirst1 and SNRFirst2 are also informative features and can be used in the feature set for classification. Other features such as received signal strength indicator (RSSI) can be included in the features 504.

The features SNRFirst, SNRMain, and ToAGap correspond to a single antenna of the electronic device. To generate a 3D FoV prediction, these measurements are obtained from two or more antennae. For example, SNRFirst1 and SNRMain1 are the CIR features obtained from antenna 1, while SNRFirst2 and SNRMain2 are the CIR features obtained from antenna 2. Additional features can be included for each additional antennas.

Referring back to FIGS. 5A, 5B, and 5C, the 3D FoV classifiers 510 and 510a (collectively 3D FoV classifiers 510), generate an output 540. The output 540 can be a FoV initial prediction of a presence of the external electronic device relative to the FoV of the electronic device based on temporal patterns of the signal information. The 3D FoV classifier 510 performs an initial FoV or out-of-FoV prediction about the target device based on the measurements 502 and the features 504 to generate the output 540. In certain embodiments, the 3D FoV classifier 510 includes multiple 3D FoV classifiers. For example, when the scenario identifier 550 is include, such as in FIG. 5C, the features 504, which are used by the scenario identifier 550, are also provided to the selected 3D FoV classifiers 510a to generate to generate the output 540 corresponding to the initial prediction.

In certain embodiments, the 3D FoV classifier 510 uses deterministic logic, a classical machine learning classifier, a deep learning classifier, or a combination thereof to generate an initial prediction of a presence of the target device relative to a FoV of the electronic device (representing the output 540). In certain embodiments, the classification of the 3D FoV classifier 510 labels the target device as in 'FoV' or 'out-of-FoV' of the electronic device based on inputs including the measurements 502 and the features 504. The label can correspond to the output 540. For example, a target device is labeled as in FoV if it lies within both azimuth and elevation FoV, otherwise the target device is labeled as 'out-of-FoV'. In certain embodiments, the classifier that is used in the 3D FoV classifier 510 include a Recurrent Neural Network (RNN). In other embodiments, the classifier that is used in the 3D FoV classifier 510 include but not limited to, K-Nearest Neighbors (KNN), Support Vector Machine (SVM), Decision Tree, Random Forest, Neural Network, Convolutional Neural Network (CNN), and the like.

Training data for the classifier of the 3D FoV classifier 510 can be collected by obtaining multiple measurements between the electronic device and the target device in FoV and out-of-FoV in both LoS and NLoS scenarios. To add variation to the training data, measurements can be taken at different ranges between the electronic device and the target device up to a maximum usable range. Also, the environment of data collection can be varied. For example, the training data can be collected in an open space environment or in a cluttered environment prone to multipath. Additional variations can also be added to the training data such as by changing the tilting angle of the electronic device, the target device, or both devices. Similarly, the training data can include further variations such as by rotating the target device at different angles in azimuth, elevation, or both. The measurements can be labeled as per the application depending on which scenario or setup is required to be labeled as FoV and which one is supposed to be out-of-FoV. In certain embodiments, the measurements can be labeled as out-of-FoV when: (i) the target lies outside the FoV of both azimuth and elevation; (ii) when the target lies in the FoV of azimuth but outside the FoV of elevation; or (iii) when the target lies in the FoV of elevation but outside the FoV of azimuth. In certain embodiments, only the measurements corresponding to when the target lies within the FoV of both azimuth and elevation are labeled as FoV.

As discussed above, the inputs to the 3D FoV classifier can come from UWB signal information including: (i) statistics (e.g., mean, variance) on the measurements 502 (e.g., range, raw AoA measurements); (ii) the features 504 from the CIR of the wireless channel between the device and the target, or a combination thereof.

Variance of some of the features (such as variance of range, variance of the AoA), over a certain sliding window also provide information that is useful for the 3D FoV classifier 510. For example, if the window size is K (such as three to seven samples), a buffer is maintained that stores previous K measurements of the features over which the variance is calculated and used in the feature vector. Instead of variance, other metrics that can measure the spread of the features can also be used.

There are several ways in which the inputs (including the measurements 502 and the features 504) are used by the 3D FoV classifier 510 to identify (predict) when the target is in FoV (representing the output 540). For example, when the direct signal path between the device and the target exists (line of sight, LoS), or in FoV, SNRFirst and SNRMain are close and ToAGap is near-zero. In contrast, in NLoS or out-of-FoV scenarios, the first peak strength 712, representing the direct signal path, is likely to be of a lower magnitude and far from the main peak strength 714, which represents the reflected signal path. Therefore, in the NLoS or out-of-FoV scenario SNRFirst is likely smaller than SNRMain and ToaGap is likely to be large. In the cases when the signal quality is bad, the first peak strength 712 the strongest peak strength 714 are susceptible to drifting and likely to have smaller magnitude, thus the difference between SNRFirst and SNRMain, as well as the ToaGap are good indicators of whether the target device is in the FoV of the electronic device.

Additional features that can be included in the features 504 and provide useful information for classifying FoV include received signal strength indicator (RSSI), CIR features from different receiver antennas (AoA is normally estimated based on the phase difference from multiple antennas) including, but not limited to, SNRFirst, SNRMain and ToAGap. The antenna from which each of those features is used depends on the corresponding hardware characteristics as suitable for classification.

The features and schemes discussed above, such as the feature vectors described in Equations (1)-(7), provide advantageous technical effects. Specifically, these features vary significantly when the target is inside FoV and outside FoV, as well as when the target is inside LoS and outside LoS. Therefore, these features are advantageous in determining a stable and accurate decision boundary between FoV and out-of-FoV scenarios, and between LoS and NLoS scenarios.

In certain embodiments, if the electronic device is equipped with only one antenna or is operating with one antenna, that is in case of 2D classification, the AoA cannot be measured at the device. But the device can use the aforementioned features that do not involve multiple antennas, and without the AoA, to perform FoV detection.

Figure 8A:
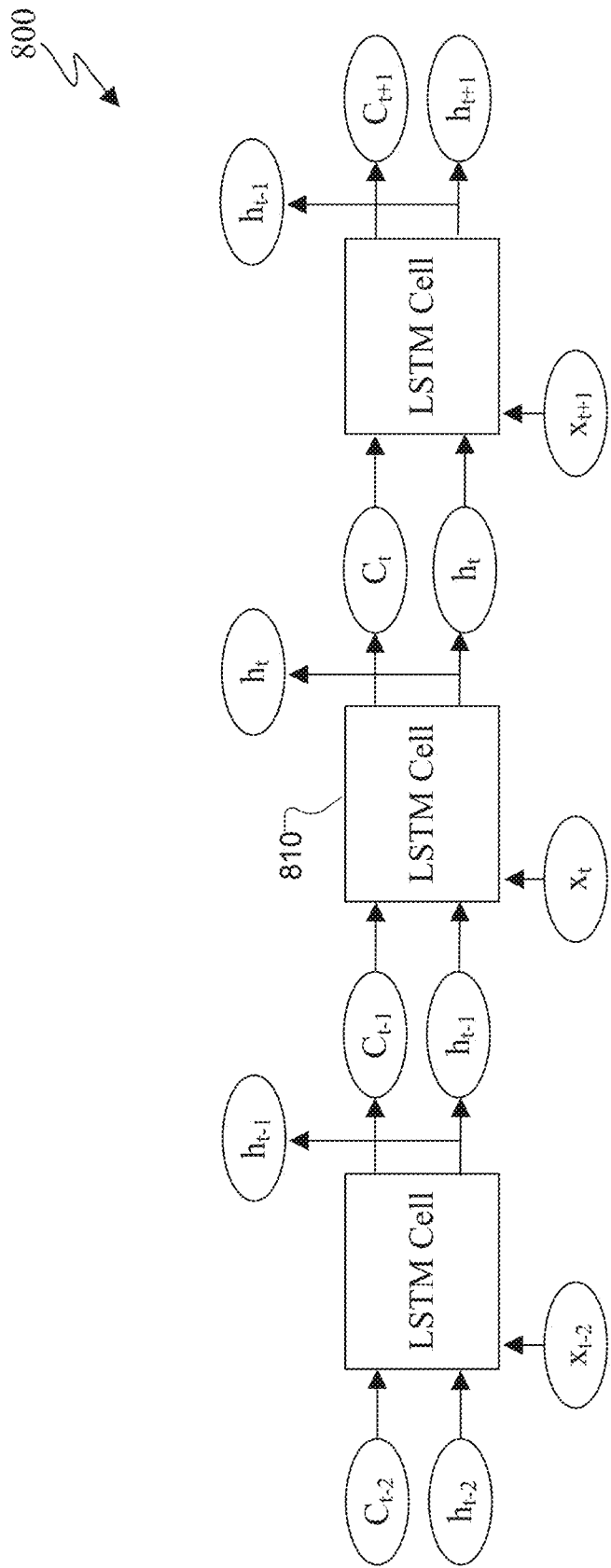
FIGS. 8A, 8B, and 8C illustrate an example classifier for determining whether an external electronic device is in the FoV of an electronic device according to embodiments of the present disclosure.
Figure 8B:
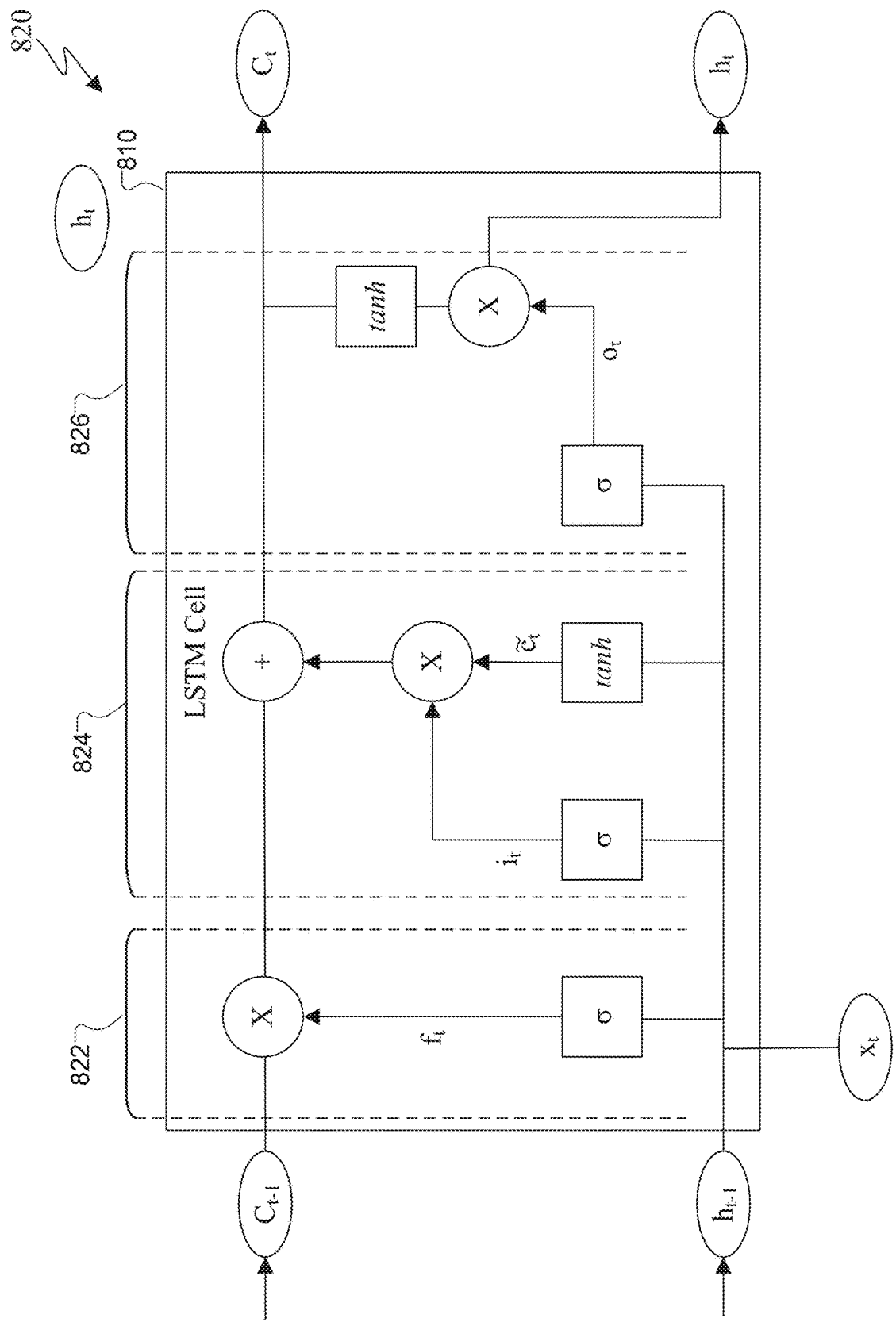
Figure 8C:
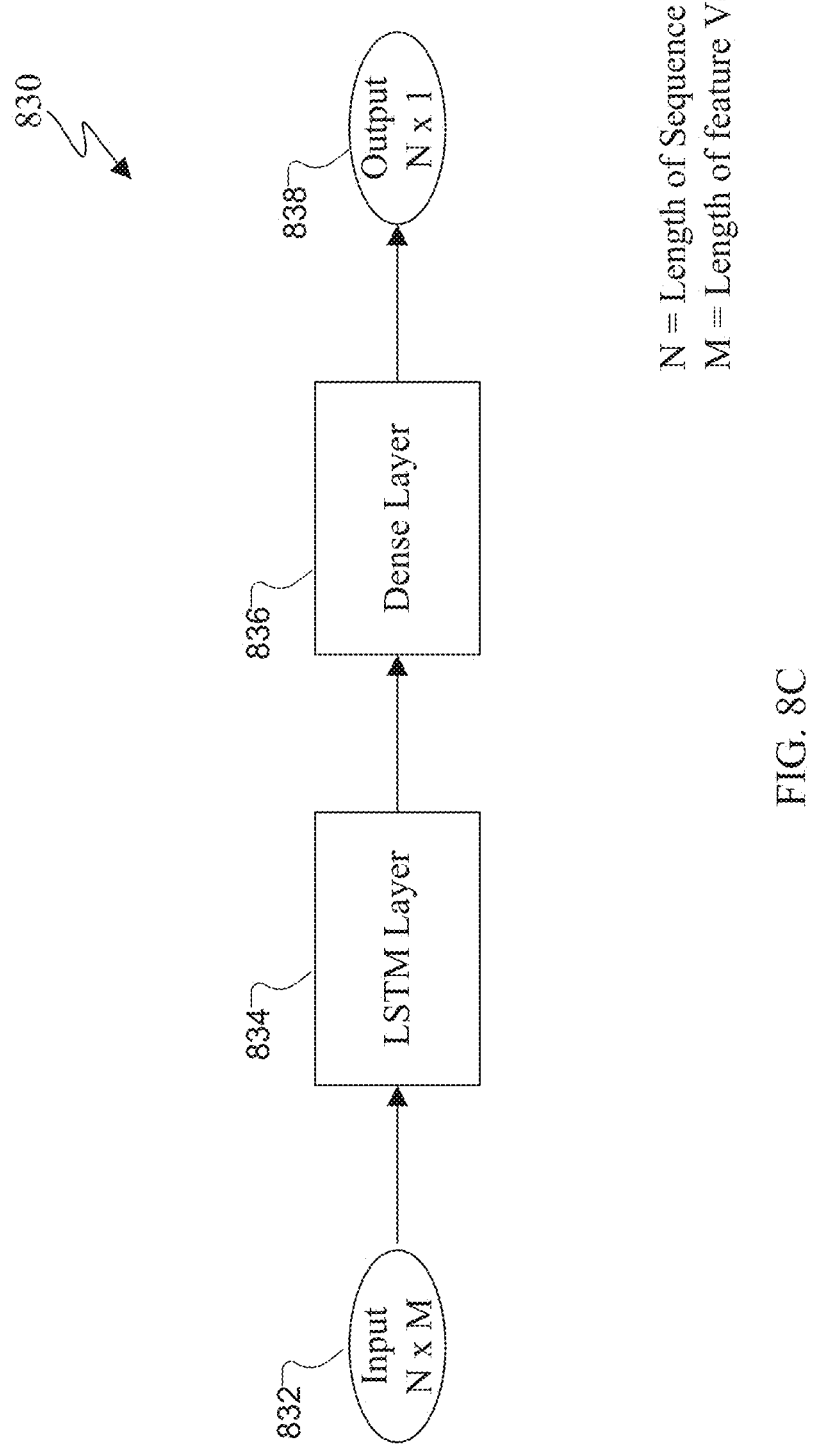

In certain embodiments, the 3D FoV classifier 510 includes a long-short term memory (LSTM) network. The 3D FoV classifier 510 can use an LSTM network to classify the target device as being in 3D FoV or out-of-3D-FoV (the output 540) using various features vectors, such as any of the feature vectors described in Equations (1)-(7), above. An LSTM network is a type of RNN that can learn long term dependences. For example, LSTM networks can be designed to capture pattern inputs' temporal domain. Stated differently, LSTM captures the temporal patterns in the sequence, and the AoA at a particular sample depends on some recent past measurements (and not on the measurements in the distant past). To do so, an LSTM network stores information in two different embedded vectors, that of (i) a cell state representing long-term memory, and (ii) a hidden state representing short term memory. FIGS. 8A, 8B, and 8C below, describe an LSTM network as used by the 3D FoV classifier 510.

In certain embodiments, the 3D FoV classifier 510 can be a multi-stage classifier. If the classifier such as the LSTM does not have satisfactory performance in some challenging LoS or NLoS scenarios, a more directed classifier based on additional manual logic can be added to create an ensemble of classifiers and correct the decision of the first classifier. The 3D FoV classifier 510 can derive information about whether the target device is in FoV based on variances of the features 504. For instance, certain features do not vary or smoothly vary when the target is in FoV, while fluctuations in these features increase when the target device is out-of-FoV. This information about the spread of the features can be used to correct the decision of the first classifier, such as the LSTM.

For example, if the variance of AoA_az in a certain window size lies above a certain threshold or if there is any measurement loss, then the output of 3D FoV classifier 510 can directly set to out-of-FoV without getting an inference from the first classifier, such as the LSTM. For another example, if (i) raw AoA_az or raw AoA_el lie outside their respective FoV ranges and (ii) the output of the first classifier, such as the LSTM is in FoV, then the 3D FoV classifier 510 changes the FoV prediction to out-of-FoV as the output 540. For another example, if (i) the output of the first classifier, such as the LSTM, is FoV, and (ii) ToAGap is above a threshold or SNRMain-SNRFirst is above its corresponding threshold, then the 3D FoV classifier 510 changes the FoV prediction to out-of-FoV, as the output 540. For yet another example, if (i) the output of the first classifier, such as the LSTM, is FoV, and (ii) variance of SNRFirst is above a threshold or variance of range is above the corresponding threshold, then the 3D FoV classifier 510 changes the FoV prediction to out-of-FoV, as the output 540.

The motion detection engine 520 of FIGS. 5A and 5C determines whether motion of the electronic device that exceeds a threshold is detected. When the motion detection engine 520 determines that motion exceeded a threshold, then the motion detection engine 520 can initiate a reset to a tracking filter of the tracking filter operation 530. For example, the motion detection engine 520 monitors measurements from a motion sensor (such as one or more of gyroscope, accelerometer, magnetometer, inertial measurement unit, and the like) of the electronic device. The motion detection engine 520 can initiate a reset operation when a detected motion exceeds a threshold. For example, a sudden motion can cause the tracking filter operation 530 to drift which takes time for the tracking filter operation 530 to converge again. Therefore, when a detected motion exceeds a threshold, the motion detection engine 520 can initiate a reset operation to reset the tracking filter of the tracking filter operation 530.

In certain embodiments (as discussed above), the motion detection engine 520 is omitted such as when the electronic device lacks a motion sensor, such as illustrated in the signal processing diagram 500b of FIG. 5B.

The tracking filter operation 530 of FIGS. 5A, 5B, and 5C, uses one or more tracking filters to smooth the range and AoA measurements via the measurements 502. Additionally, if the electronic device is equipped with a motion sensor (such as a motion sensor that is included in the sensor module 376 of FIG. 3 or a motion sensor that is included in the sensor 265 of FIG. 2), information about the motion and orientation change of the electronic device from this sensor can be used in the tracking filter operation 530 to further improve the quality of range and AoA measurements.

In certain embodiments, more than one tracking filter can be used where each tracking with a different hypothesis. Example tracking filters include a Kalman filter, an extended Kalman filter, a particle filter, and the like. The tracking filter operation 530 generates output 542. The output 542 can include smoothed range (in meters, centimeters or other distance based metrics). The output 542 can also include the smoothed AoA_el and the smoothed AoA_az (in degrees, radians or other angle based metrics).

FIGS. 8A, 8B, and 8C illustrate an example classifier for determining whether an external electronic device is in the FoV of an electronic device according to embodiments of the present disclosure. More particularly, FIG. 8A illustrates a diagram 800 describing unrolling LSTM forward pass according to embodiments of the present disclosure. FIG. 8B illustrates diagram 820 describing a LSTM cell of the diagram 800 of FIG. 8A according to embodiments of the present disclosure. FIG. 8C illustrates an example network architecture 830 for 3D FoV classification according to embodiments of the present disclosure. The embodiments of FIGS. 8A, 8B, and 8C can be included within or associated with the 3D FoV classifier 510 and of FIGS. 5A and 5B and the 3D FoV classifier 510a of FIG. 5C.

LSTM is a special type of RNN that is designed specifically to capture the pattern from the input's temporal domain. It has the advantageous capability to deal with long sequence and store information in two embedded vectors. The cell state represents the long-term memory, and the hidden state represents the short-term memory. Unrolling an LSTM forward pass will result in a chain of repeating cells (such as the LSTM cell 810) connected recurrently as shown in the diagram 800 of FIG. 8A.

At one particular time step, there are three inputs to a given LSTM cell (such as the LSTM cell 810), including the current time step input $x_t$, the hidden state vector from the previous time step unit $h_{t-1}$ and the cell state of the previous time step $C_{t-1}$. In turn, the outputs of the LSTM cell include the current time step hidden state $h_t$ and the current time step cell state $C_t$.

A LSTM cell 810 is illustrated in the diagram 820 of FIG. 8B. Each cell contains three layers or gates such as a first gate 822, a second gate 824, and a third gate 826. The first gate 822 is a forget gate layer, which uses a sigmoid function as activation to control the flow of old memory. Based on the current input and previous cell's output, this layer returns a number $f_t$ between 0 and 1 for each element of old memory state. An output value $f_t$ that is close to 0 indicates that element of old memory should be removed, while an output value $f_t$ that is close to 1 indicates that element should be retained. Equation (8) describes calculating the output value $f_t$.

$$f_t = \sigma(W_{xf} x_t + W_{hf} h_{t-1} + b_f) \quad (8)$$

Here the weights, $W_{xf}$ and $W_{hf}$, and bias $b_f$ are trainable parameters that are obtained during the training process.

The second gate 824 is the new memory gate. The new memory gate controls what new information should be added to the memory state. The sigmoid layer (having an output denoted in FIG. 8B as $i_t$) decides which new information should be added or ignored, while tanh layer creates a vector $\tilde{C}_t$ for the new candidate values. The outputs of these two layers are element wise multiplied and added to the old memory to produce a value $C_t$. The values relevant to the second gate calculated as described in Equation (9), Equations (10), and Equations (11).

$$i_t = \sigma(W_{xi} x_t + W_{hi} h_{t-1} + b_i) \quad (9)$$

$$\tilde{C}_t = \tanh(W_{xc} x_t + W_{hc} h_{t-1} + b_c) \quad (10)$$

$$C_t = f_t \cdot C_{t-1} + i_t \cdot \tilde{C}_t \quad (11)$$

Here, the weights, $W_{xi}$, $W_{hi}$, $W_{xc}$ and $W_{hc}$, and bias $b_i$ and $b_c$ are trainable parameters that are obtained during the training process.

The third gate 826 is the output gate. The output gate decides the output of the cell and depends on the current memory state, previous memory state and current input as described in Equation (12) and Equation (13).

$$o_t = \sigma(W_{xo} x_t + W_{ho} h_{t-1} + b_o) \quad (12)$$

$$h_t = o_t \cdot \tanh(C_t) \quad (13)$$

Here, the weights, $W_{xo}$ and $W_{ho}$, and bias $b_o$ are trainable parameters that are obtained during the training process.

The network architecture 830 of FIG. 8C describes the overall process of the 3D FoV classifier 510 using LSTM for performing 3D FoV classification. The network architecture 830 includes an input 832, an LSTM layer 834 (similar to the diagram 800 of FIG. 8A), a dense layer 836 and an output 838.

The input 832 for the LSTM is prepared by generating a feature vector (such as the feature vectors described in Equations (1)-(7), above) for each sample of the sequence. Each sample feature vector is 1×M (where M is the length of the feature vector) and N such samples in a sequence are input to the LSTM.

Using the feature vector of Equation (1), feature vector length M=17 (due to there being 17 elements in the feature vector of Equation (1)) and sequence length N is variable depending on how long the data is captured. The output of the LSTM layer 834 is fed into a dense layer 836. In the dense layer 836 every neuron in a given layer is connected to all neurons in the preceding layer, which outputs a probability value for FoV/out-of-FoV, which is then thresholded to decide whether the target is in FoV or out-of-FoV, which is the output 838.

LSTM captures the temporal patterns in the sequence, and the angle of arrival at a particular sample depends on some recent past measurements (and not on the measurements in the distant past). If the training data sequences are too long, they are broken down into smaller overlapping sequences so that LSTM does not keep a memory of samples in the distant past. For example, if the sequence length of 500 with an overlap of 200 is used. Hence, N in FIG. 8C is set to 500. It is noted that any amount of overlap can be chosen.

In certain embodiments, measurements can be lost. During training, lost measurements are ignored and the remaining measurements are treated as a continuous sequence. During inference, lost measurements are labeled as out-of-FoV. Alternatively during inference, zero imputation can be done for lost measurements where all the features in lost measurements can be assigned a zero value and a new feature is added in the feature set which indicates if the measurements were lost or not. Example value of this feature can be 0 for not lost measurements and 1 for all lost measurements.

In other embodiments, other architectures involving LSTM, such as multi-layer perceptron (MLP), convolutional neural network (CNN), and the like can be used. In yet other embodiments, to perform 2D classification (such as a classification in only azimuth or only elevation), a similar architecture as described above using LSTM of FIGS. 8A-8C with features from a single appropriate antenna pair can be used.

In some instances, the 3D FoV classifier 510 can be a multi-stage classifier. For example, if the 3D FoV classifier 510 described above does not have satisfactory performance in some challenging LOS or NLOS scenarios, a more directed classifier based on additional manual logic can be added to create an ensemble of classifiers and correct the decision of the first classifier. Variance of the features provide important information about the target being in FoV since these features do not vary much or vary smoothly when the target is in FoV; however, the fluctuations in these features increase in out-of-FoV. This information about the spread of the features can be used to correct the decision of the classifier. In the first embodiment, if the variance of AoA_az in a certain window size lies above a certain threshold or if there is any measurement loss, the output of classification is directly set to out-of-FoV without getting an inference from the 3D FoV classifier 510. Also, if raw AoA_az or raw AoA_el lie outside their respective FoV ranges and the output of 3D classifier is FoV, it is overwritten to out-of-FoV.

In certain embodiments, if the output of the 3D FoV classifier 510 is FoV, but ToAGap is above a threshold or SNRMain-SNRFirst is above its corresponding threshold, the output of the classifier is corrected to out-of-FoV. In another embodiment, if the output of the 3D classifier is FoV, but variance of SNRFirst is above a threshold or variance of range is above the corresponding threshold, the output of the classifier is corrected to out-of-FoV.

Figure 9:
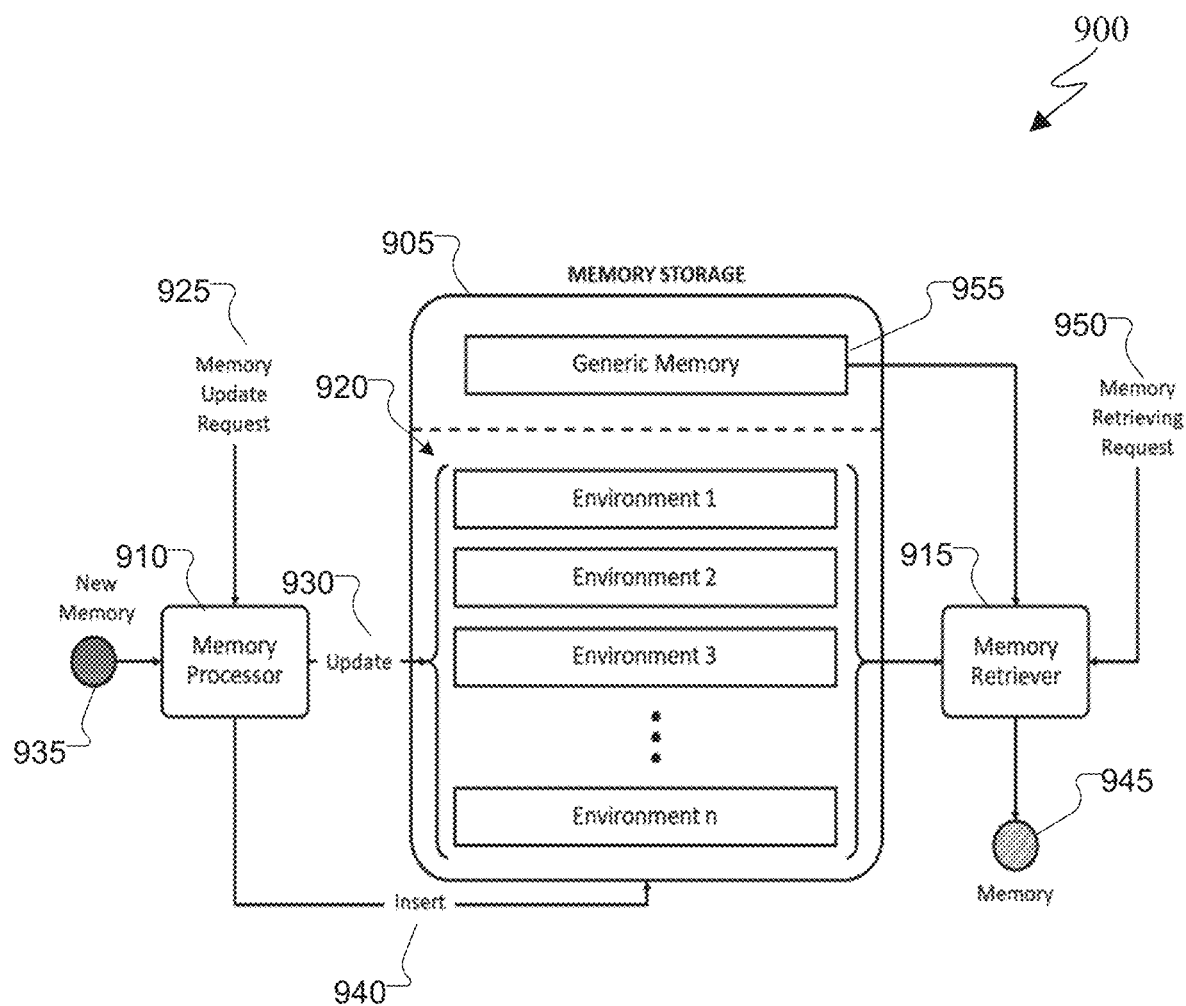
FIG. 9 illustrates an augmented memory module architecture according to embodiments of the present disclosure.

FIG. 9 illustrates an augmented memory module architecture according to embodiments of the present disclosure. The embodiment of the AMM 900 shown in FIG. 9 is for illustration only. Other embodiments could be used without departing from the scope of the present disclosure.

The AMM 900 is used to enhance the overall performance and the adaptability of the entire system by taking advantage of the environments' parameters that the system has already observed. These environmental parameters are encoded into a memory vector that can be stored and reused appropriately later in order to avoid a blank state every time the system encounters an environment that it has seen before. The primary functions of the modules are to process, store, and fetch memory collected from one or more collections of observed environments. The AMM 900 includes: a Memory Storage 905, the Memory Processor 910, and the Memory Retriever 915.

The AMM 900 is configured to increase the performance of the 3D FOV classifier 510 especially in the beginning duration of the encounter with a familiar environment to detect the target object. Additionally, the mechanism in the Memory Processor 910 also allows the AMM 900 to update its memories if there is a change in the environment. Therefore, the adaptability of the system is increased and will be more effective comparison to a static system where there is no memory to be utilized.

Memory refers to a set of encoded information generated from the inputs which have been observed and learned so far. Specifically, from the input, crucial information is extracted, encoded into a parameterized form, via different mechanisms and stored as memory. The encoded information in the memory contains valuable information from past experience and highly likely to contain information related to the environment. In this sense, memory is often in a tangible form such as a tensor with multiple values. In certain embodiments, the memory can be the long-term memory cell state extracted from the LSTM 3D FOV classifier 510. Specifically, the memory state is a tensor of shape (D*l, H) containing real values that represent information of the previous hidden states and the past inputs where D=2 if the LSTM is a bidirectional LSTM (sequences are processed in both backward and forward direction) and D=1 otherwise. Additionally, l is the number of LSTM cells and H is the hidden size of the LSTM. In the case where the FoV classifier is implemented using traditional RNN or Gated Recurrent Unit (GRU), the memory state is the hidden state.

Figure 10:
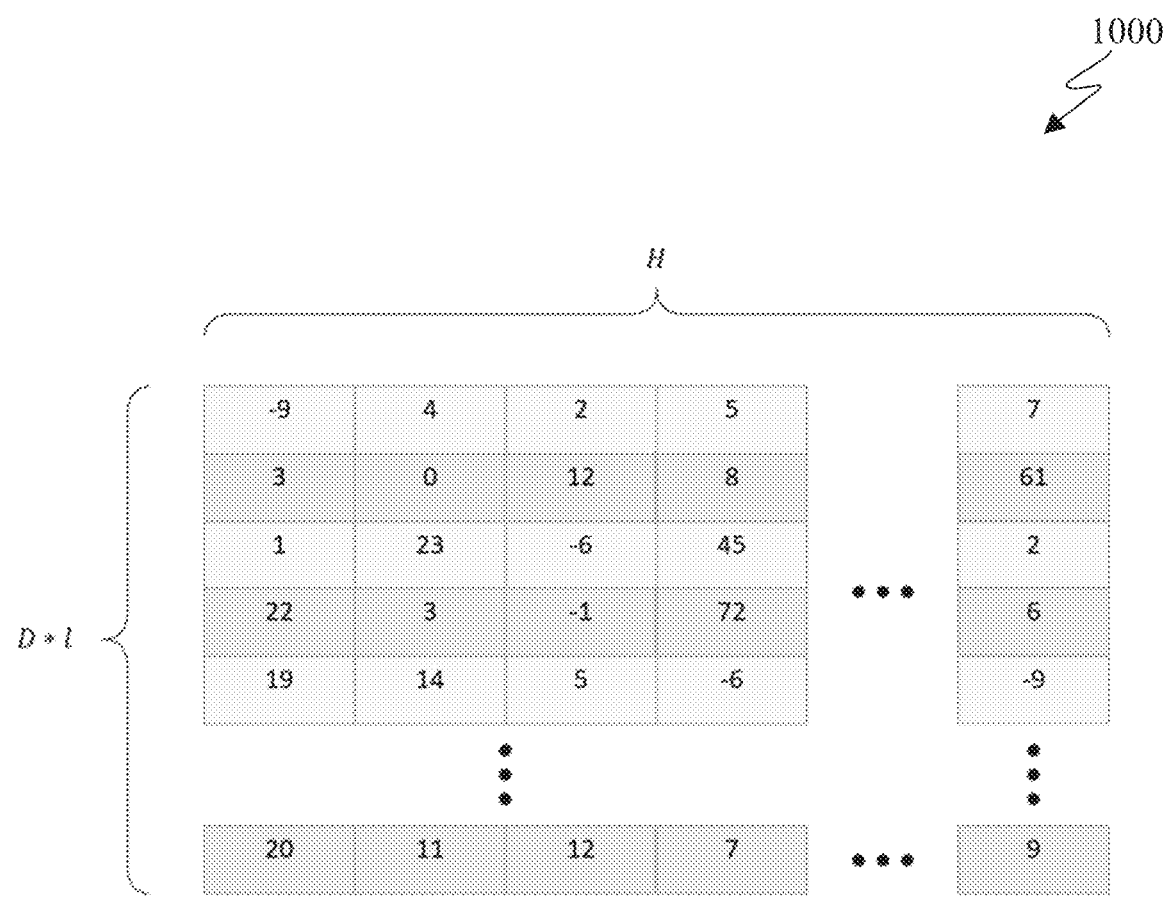
FIG. 10 illustrates an example memory state diagram according to embodiments of the present disclosure.

FIG. 10 illustrates an example memory state diagram according to embodiments of the present disclosure. The embodiment of the memory state diagram 1000 shown in FIG. 10 is for illustration only. Other embodiments could be used without departing from the scope of the present disclosure.

In a first example the memory state diagram 1000, assuming a case where the RNN is bidirectional, the first l rows illustrate the previous hidden states and the past inputs for the forward direction of the l LSTM cells or RNN units (e.g., first row shows previous hidden states and the past inputs for the forward direction of the $1^{st}$ LSTM cell or RNN unit; second row shows previous hidden states and the past inputs for the forward direction of the $2^{st}$ LSTM cell or RNN unit; etc.). Furthermore, in such a case, the next l rows illustrate the previous hidden states and the past inputs for the backward direction of the l LSTM cells or RNN units (e.g., (l+1)$^{th}$ row shows previous hidden states and the past inputs for the backward direction of the $1^{st}$ LSTM cell or RNN unit; (l+2)$^{th}$ row shows previous hidden states and the past inputs for the backward direction of the $2^{nd}$ LSTM cell or RNN unit; etc.).

In another example of the memory state diagram 1000, assuming a case where the RNN is not bidirectional, the l rows illustrate the previous hidden states and the past inputs for the forward direction of the l LSTM cells or RNN units (e.g., first row shows previous hidden states and the past inputs for the $1^{st}$ LSTM cell or RNN unit; second row shows previous hidden states and the past inputs for the $2^{st}$ LSTM cell or RNN unit; etc.).

The memory storage (MS) 905 is a data table that is used to store the memory vector extracted from each environment 920 In one embodiment, the memory storage can be implemented using a hash table so that accessing the specific memory can be quick. When the system encounters an environment which has been seen before, the memory corresponding to that environment can be retrieved for usage. Tagging an environment is also a function that needs to be carefully defined so that the environment and the memory can be associated appropriately.

Different embodiments of the environmental tagging mechanism are possible. In certain embodiments, the environment can be tagged using unique identification such as global positioning system (GPS) geolocation. In another embodiment, the environment tagging is done by using the service set identifier (S SID) of the available Wi-Fi network at that location. In another embodiment, the environment tagging is done by comparing the UWB or BLUETOOTH ID of surrounding stationary devices (TV, refrigerator, etc.).

The memory processor 910 writes new memories to the memory storage 905 as further illustrated herein below with respect to FIG. 11. In operation 1105, the memory processor 910 determines whether the memory relates to a new environment. In operation 1110, the memory processor 910 receives new memories if the memories come from a previously observed environment 925. The memory processor 910 updates 930 the memories using Equation 14:

$$m_e \leftarrow m_e + \mu^*(nm_e - m_e) \quad (14)$$

In Equation 14: $m_e$ is the memory correspondent to environment e stored in memory storage M; $nm_e$ is the new memory generated by the FoV classifier from environment e; and μ is the updated rate ranging from 0 to 1. In operation 1115, when the environment is new 935, the memory processor 910 inserts 940 the new memory into the memory storage 905 M.

The memory retriever 915 retrieves memories from the memory storage 905 as further illustrated herein below with respect to FIG. 12. In operation 1205, in response to a memory retrieving request 950, the memory retriever 915 determines whether the memory relates to a new environment. In operation 1210, when the environment is not new, the memory retriever 915 reads memory from the memory storage 905 and provides the read memory 945 to the FoV classifier given that environment has been observed before. In operation 1215, when the environment has not been observed before, the memory retriever 915 provides a generic memory 955 to the FoV classifier. This generic memory is specifically trained along the main LSTM with the goal that the classifier can learn a good default initial state. The generic memory is also a tensor of shape (D*l, H) which was described earlier in this section. In this case, the tensor contains real values that represent information of the initial hidden states for the FoV classifier.

In certain embodiments, the utilization of the AMM 900 is as follows. When the 3D FOV system encounters an unknown environment the 3D FOV classifier 510 starts from a blank state, meaning there is no memory of this new environment. This will result in lower performance of the classifier at the beginning. The performance increases when the classifier is more familiar with the performance by processing more inputs gathered from this environment. At this point the current long-term memory cell state of the 3D FOV classifier 510 is tagged and stored in the AMM 900 by the memory processor 910. Alternatively, when the system encounters a familiar environment, the encoded memory corresponding to this environment will be retrieved from the AMM 900 by the memory retriever 915 and subsequently provided to the 3D FOV classifier 510. This way, the 3D FOV classifier 510 will not have to start from a blank state and the performance in the beginning of the encounter will be much better. Additionally, the memory dedicated to this environment will be updated from this encounter using the mechanism in the memory processor 910. This process provides the system some level of adaptability toward the changes in the environment.

Figure 11:
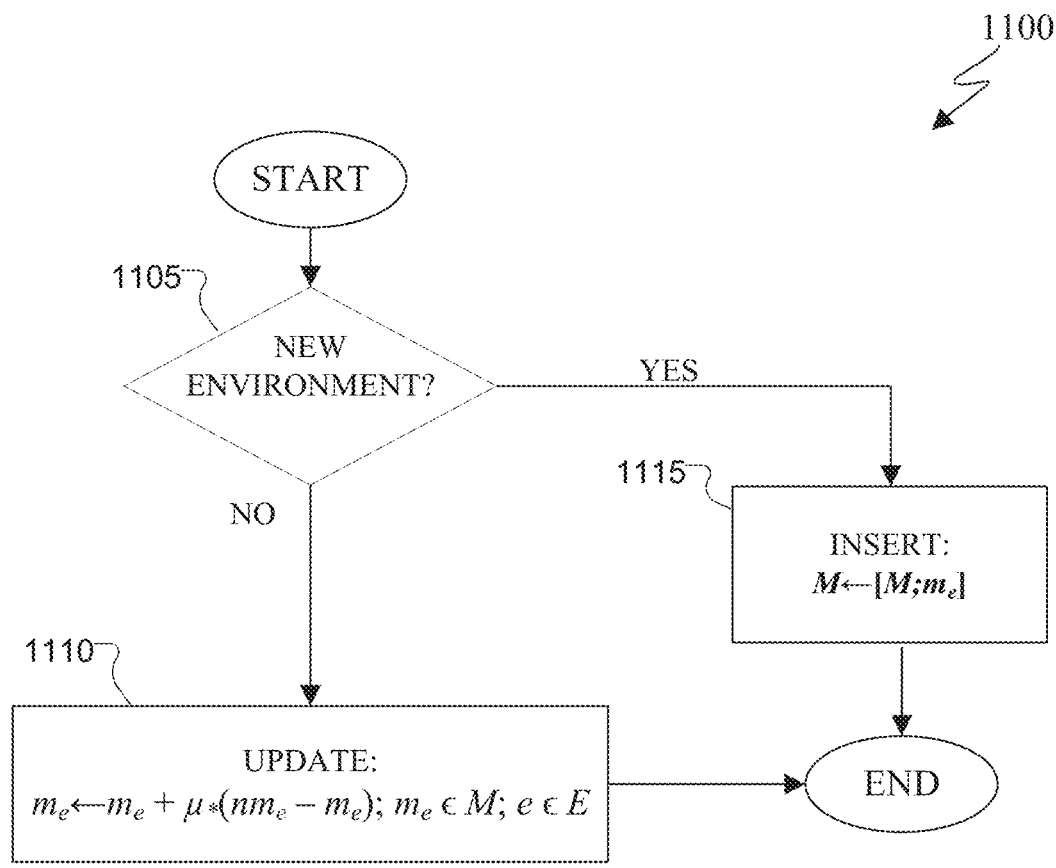
FIGS. 11 and 12 illustrate example processes for a memory processor and a memory retriever according to embodiments of the present disclosure.
Figure 12:
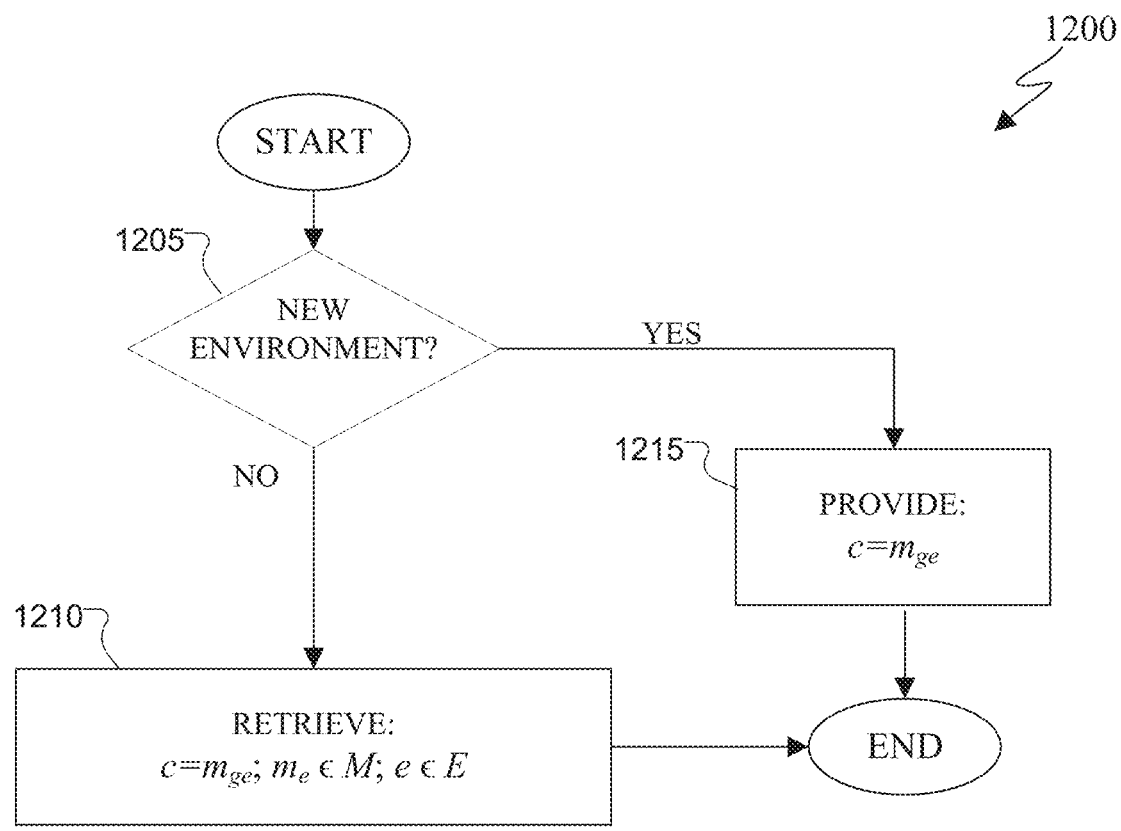

While the flow chart in FIGS. 11 and 12 depict series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter and processor circuitry in, for example, a respective UE. Processes 1100 and 1200 can be accomplished by, for example, UE 116 or network device in network 100.

Figure 13:
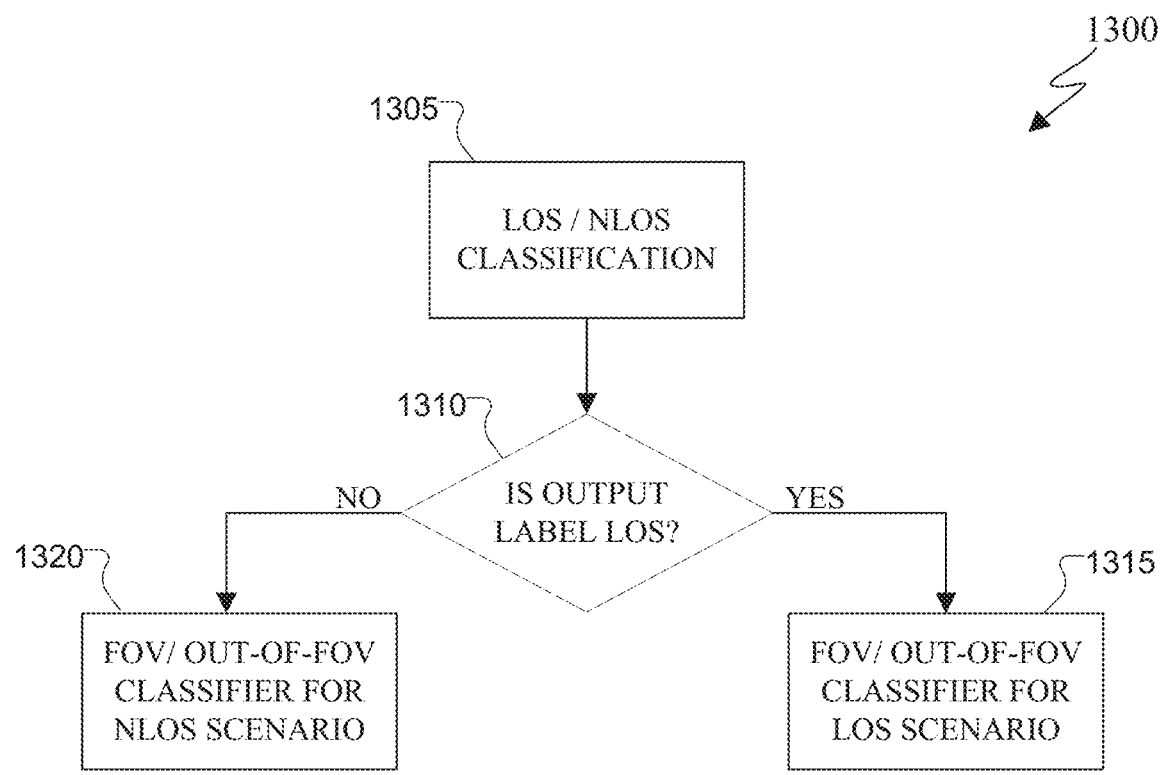
FIG. 13 illustrates example method of scenario identification for selecting a classifier for an initial FoV determination according to embodiments of the present disclosure.

FIG. 13 illustrates example method of scenario identification, via the scenario identifier 550 of FIG. 5C for selecting a classifier for an initial FoV determination by the 3D FoV classifier 510*a* according to embodiments of the present disclosure. The method 1300 is described as implemented by any one of the client devices 106-114 of FIG. 1 and can include internal components similar to that of electronic device 200 of FIG. 2 and the electronic device 301 of FIG. 3. However, the method 1300 as shown in FIG. 13 could be used with any other suitable electronic device and in any suitable system.

As illustrated in the method 1300, the scenario identifier 550 can include a classifier that initially labels the scenario to be LoS or NLoS. Then the scenario identifier 550 selects one of multiple 3D FoV classifiers, such as the 3D FoV classifier 510*a*, that is trained in that particular scenario labels the target to be in FoV or out-of-FoV. That is, as illustrated in the method 1300, the 3D FoV classifier 510*a* represents two different classifiers. The first classifier is for FoV/out-of-FoV detection in LoS scenario (operation 1315) and the second for FoV/out-of-FoV detection in NLoS scenario (operation 1320). In other embodiments the scenario identifier 550 can identify additional scenarios in addition to (or in alternative of) the LoS or NLoS scenarios. For example, the scenario identifier 550 can identify a scenario based on a distance between the electronic device and the target device and based on the distance the scenario identifier 550 selects one of multiple 3D FoV classifiers, that is trained in that particular scenario.

In operation 1305, the scenario identifier 550 labels the target device as either in LoS or NLoS, based on the features 504. In in operation 1310, the scenario identifier 550 determines which classifier to select to perform the FoV determination, based on the label assigned to the target device. When the target device is classified as LoS, then in operation 1315, a 3D FoV classifier, such as the 3D FoV classifier 510*a*, is selected, when the 3D FoV classifier 510*a* is trained for LoS scenarios. The selected classifier of operation 1315 then determines whether the target device is in FoV or out of the FoV of the electronic device. Alternatively, when the target device is classified as NLoS, then in operation 1320, a 3D FoV classifier such as the 3D classifier 510*b* (not shown), when the 3D classifier 510*b* is trained for NLoS scenarios. The selected classifier of operation 1320 then determines whether the target device is in FoV or out of the FoV of the electronic device.

Although FIG. 13 illustrates an example method, various changes may be made to FIG. 13. For example, while the method 1300 is shown as a series of steps, various steps could overlap, occur in parallel, occur in a different order, or occur multiple times. In another example, steps may be omitted or replaced by other steps.

Figure 14:
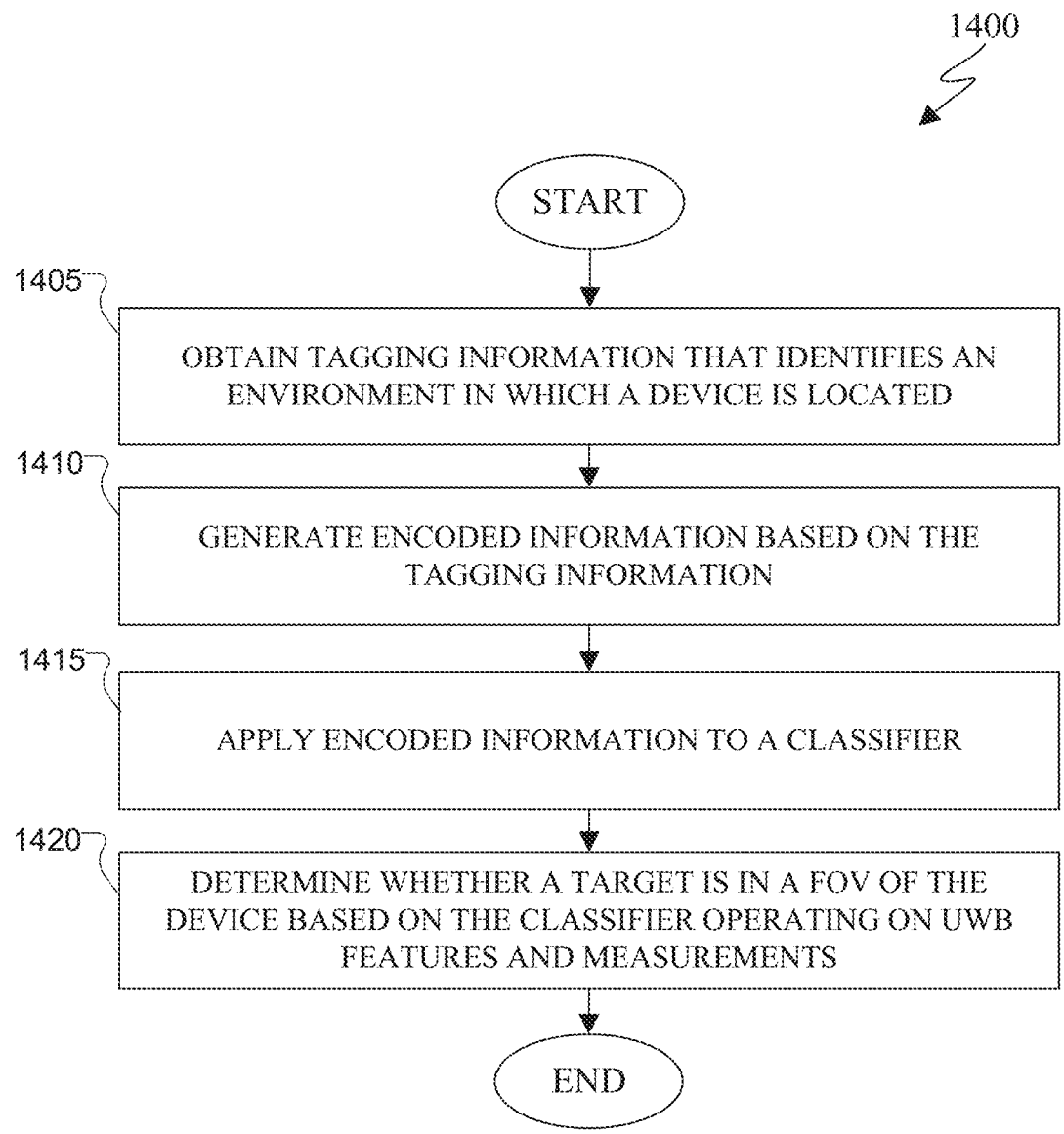
FIG. 14 illustrates an example method for FoV determination based on new or existing environment according to embodiments of the present disclosure.

FIG. 14 illustrates an example method 1400 for FoV determination based on new or existing environment according to embodiments of the present disclosure. While the flow chart in FIG. 14 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter and processor circuitry in, for example, a respective UE. Method 1400 can be accomplished by, for example, UE 116 or a network device in network 100.

In operation 1405, the electronic device obtains tagging information that identifies an environment in which a device is located. The wireless signals can be received by the electronic device via a first antenna pair and a second antenna pair that are aligned along different axes. The AMM 900 can take in the environmental parameters, and then identify whether the environment has been observed before to issue the appropriate memory state. The signal information includes channel information, range information, a first AoA of the wireless signals based on the first antenna pair, and a second AoA of the wireless signals based on the second antenna pair. The first AoA can be in azimuth while the second AoA can be in elevation, or vis-versa. In certain embodiments, the tagging information can include GPS geolocation information, an SSID of a Wi-Fi network at a location, or the device IDs of stationary devices in the environment.

The channel information can include features of a first CIR and a second CIR of wireless communication channels from the first and second antenna pairs, respectively. The first CIR and the second CIR can be based on the wireless signals communicated between the electronic device and the external electronic device.

In operation 1410, the electronic device generates encoded information from a memory module based on the tagging information. In certain embodiments, the encoded information is generated based on a neural network operating on the tagging information. The neural network can include a LSTM neural network. In cases where the electronic device has previously encountered the environment, the encoded information includes a current long term memory cell state of the 3D FoV classifier 510. In cases where the electronic device has not previously encountered the environment, the encoded information includes a generic initial state of the 3D FoV classifier 510.

In operation 1415, the electronic device applies the encoded information to a 3D FoV classifier 510. For example, the electronic device can initialize the 3D FoV classifier 510 using the encoded information.

In operation 1420, the electronic device determines whether a target is in a FoV of the electronic device based on the 3D FoV classifier 510 operating on UWB features and measurements based on, or included in, the signal information obtained by the electronic device. In certain embodiments, the electronic device further updates the encoded information associated with the tagging information after determining whether a target is in a FoV of the electronic device.

Although FIG. 14 illustrates an example method, various changes may be made to FIG. 14. For example, while the method 1400 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. An electronic device, comprising:
a processor configured to:
obtain signal information based on wireless signals received from a target electronic device via a first antenna pair and a second antenna pair, wherein the first and second antenna pairs are aligned along different axes and wherein the signal information includes channel information, range information, a first angle of arrival (AoA) of the wireless signals based on the first antenna pair, and a second AoA of the wireless signals based on the second antenna pair;
obtain tagging information that identifies an environment in which the electronic device is located;
generate encoded information from a memory module based on the tagging information;
initialize a field of view (FoV) classifier based on the encoded information; and
determine whether the target electronic device is in a FoV of the electronic device based on the FoV classifier operating on the signal information.

2. The electronic device of claim 1, wherein:
when the electronic device has previously encountered the environment, the encoded information includes a current long-term memory cell state of the FoV classifier; or
when the electronic device has not previously encountered the environment, the encoded information includes a generic initial state of the FoV classifier.

3. The electronic device of claim 1, wherein the processor is further configured to:
update the encoded information associated with the tagging information.

4. The electronic device of claim 1, wherein:
the tagging information includes a global positioning system (GPS) geolocation information, a service set identifier (SSID) of a Wi-Fi network at a location, or an ID of a stationary external electronic device located in the environment.

5. The electronic device of claim 1, wherein the processor is further configured to:
determine whether the environment is a new environment or a previously experienced environment.

6. The electronic device of claim 1, wherein the FoV classifier comprises at least one of: an augmented memory module or a long-short term memory (LSTM) neural network.

7. The electronic device of claim 4, wherein:
the channel information comprises features of a first channel impulse response (CIR) and a second CIR of wireless communication channels from the first and second antenna pairs, respectively, wherein the first CIR and the second CIR are based on the wireless signals communicated between the electronic device and the target electronic device;
the processor is further configured to generate a feature vector based on the range information, the first and the second AoA, and the features; and
wherein the feature vector comprises at least two of:
the range information, indicating a distance between the electronic device and the target electronic device;
the first AoA;
the second AoA;
phase difference of arrival from the first and second antenna pairs;
an index of the phase difference of arrival from the first and second antenna pairs;
strength of a first peak of the first CIR;
strength of a strongest peak of the first CIR;
an index of the first peak from the first CIR;
an index of the strongest peak from the first CIR;
strength of a first peak of the second CIR;
strength of a strongest peak of the second CIR;
an index of the first peak from the second CIR;
an index of the strongest peak from the second CIR;
a variance of the first AoA over a first time interval;
a variance of the first AoA over a second time interval that is longer than the first time interval;
a variance of the second AoA over the first time interval;
a variance of the second AoA over the second time interval;
a first time difference between the first peak strength of the first CIR and the strongest peak strength of the first CIR; or
a second time difference between the first peak strength of the second CIR and the strongest peak strength of the second CIR.

8. A method for operating an electronic device, the method comprising:
obtaining signal information based on wireless signals received from a target electronic device via a first antenna pair and a second antenna pair, wherein the first and second antenna pairs are aligned along different axes and wherein the signal information includes channel information, range information, a first angle of arrival (AoA) of the wireless signals based on the first antenna pair, and a second AoA of the wireless signals based on the second antenna pair;
obtaining tagging information that identifies an environment in which the electronic device is located;
generating encoded information from a memory module based on the tagging information;
initializing a field of view (FoV) classifier based on the encoded information; and
determining whether the target electronic device is in a FoV of the electronic device based on the FoV classifier operating on the signal information.

9. The method of claim 8, wherein:
when the electronic device has previously encountered the environment, the encoded information includes a current long-term memory cell state of the FoV classifier; or
when the electronic device has not previously encountered the environment, the encoded information includes a generic initial state of the FoV classifier.

10. The method of claim 8, further comprising:
updating the encoded information associated with the tagging information.

11. The method of claim 8, wherein:
the tagging information includes a global positioning system (GPS) geolocation information, a service set identifier (SSID) of a Wi-Fi network at a location, or an ID of a stationary external electronic device located in the environment.

12. The method of claim 8, further comprising:
determining whether the environment is a new environment or a previously experienced environment.

13. The method of claim 8, wherein the FoV classifier comprises at least one of: an augmented memory module or a long-short term memory (LSTM) neural network.

14. The method of claim 8,
wherein the channel information comprises features of a first channel impulse response (CIR) and a second CIR of wireless communication channels from the first and second antenna pairs, respectively, wherein the first CIR and the second CIR are based on the wireless signals communicated between the electronic device and the target electronic device,
the method further comprising:
generating a feature vector based on the range information, the first and the second AoA, and the features, wherein the feature vector comprises at least two of:
the range information, indicating a distance between the electronic device and the target electronic device;
the first AoA;
the second AoA;
phase difference of arrival from the first and second antenna pairs;
an index of the phase difference of arrival from the first and second antenna pairs;
strength of a first peak of the first CIR;
strength of a strongest peak of the first CIR;
an index of the first peak from the first CIR;
an index of the strongest peak from the first CIR;
strength of a first peak of the second CIR;
strength of a strongest peak of the second CIR;
an index of the first peak from the second CIR;
an index of the strongest peak from the second CIR;
a variance of the first AoA over a first time interval;
a variance of the first AoA over a second time interval that is longer than the first time interval;
a variance of the second AoA over the first time interval;
a variance of the second AoA over the second time interval;
a first time difference between the first peak strength of the first CIR and the strongest peak strength of the first CIR; or
a second time difference between the first peak strength of the second CIR and the strongest peak strength of the second CIR.

15. A non-transitory computer readable medium containing instructions that when executed by a processor of an electronic device, cause the processor to:
obtain signal information based on wireless signals received from a target electronic device via a first antenna pair and a second antenna pair, wherein the first and second antenna pairs are aligned along different axes and wherein the signal information includes channel information, range information, a first angle of arrival (AoA) of the wireless signals based on the first antenna pair, and a second AoA of the wireless signals based on the second antenna pair;
obtain tagging information that identifies an environment in which the electronic device is located;
generate encoded information from a memory module based on the tagging information;
initialize a field of view (FoV) classifier based on the encoded information; and
determine whether the target electronic device is in a FoV of the electronic device based on the FoV classifier operating on the signal information.

16. The non-transitory computer readable medium of claim 15, wherein the instructions are further configured to cause the processor to:
update the encoded information associated with the tagging information.

17. The non-transitory computer readable medium of claim 15, wherein:
when the electronic device has previously encountered the environment, the encoded information includes a current long-term memory cell state of the FoV classifier; or
when the electronic device has not previously encountered the environment, the encoded information includes a generic initial state of the FoV classifier.

18. The non-transitory computer readable medium of claim 15, wherein:
the tagging information includes a global positioning system (GPS) geolocation information, a service set identifier (SSID) of a Wi-Fi network at a location, or an ID of a stationary external electronic device located in the environment.

19. The non-transitory computer readable medium of claim 15, wherein the instructions are further configured to cause the processor to:
determine whether the environment is a new environment or a previously experienced environment.

20. The non-transitory computer readable medium of claim 18, wherein the FoV classifier comprises at least one of: an augmented memory module or a long-short term memory (LSTM) neural network.

* * * * *